(12) United States Patent
Suzuki et al.

(10) Patent No.: US 7,011,452 B2
(45) Date of Patent: Mar. 14, 2006

(54) ROLLING BEARING UNIT WITH SHIELD PLATE

(75) Inventors: Hironori Suzuki, Fujisawa (JP); Takamasa Itsu, Fujisawa (JP); Hiroyuki Osawa, Fujisawa (JP); Takahiko Uchiyama, Fujisawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 10/766,875

(22) Filed: Jan. 30, 2004

(65) Prior Publication Data

US 2004/0184690 A1 Sep. 23, 2004

Related U.S. Application Data

(63) Continuation of application No. 09/503,489, filed on Feb. 14, 2000, which is a continuation-in-part of application No. 09/060,976, filed on Apr. 16, 1998, now abandoned.

(30) Foreign Application Priority Data

Apr. 16, 1997 (JP) .................................... 9-99251
Apr. 10, 1998 (JP) .................................... 10-98667

(51) Int. Cl.
*F16C 33/76* (2006.01)
*F01D 11/02* (2006.01)

(52) U.S. Cl. ............... 384/486; 384/477; 384/484; 277/411; 528/22

(58) Field of Classification Search ........... 384/477, 384/480, 484, 485, 486, 488; 277/925, 411, 277/421; 528/22
See application file for complete search history.

(56) References Cited

U.S. PATENT DOCUMENTS

| | | | |
|---|---|---|---|
| 2,375,166 A | 5/1945 | Cooper | |
| 2,766,082 A | 10/1956 | Ritchey | |
| 3,550,974 A | 12/1970 | Kupchick | |
| 3,597,030 A | 8/1971 | Hallerback | |
| 3,854,734 A | 12/1974 | West | |
| 3,994,545 A | 11/1976 | Van Dorn | |
| 4,339,565 A | 7/1982 | Tomoda | |
| 4,830,518 A | 5/1989 | Shiratani et al. | |
| 4,934,714 A | 6/1990 | Lynch | |
| 5,133,609 A | 7/1992 | Ishiguro | |
| 5,332,232 A | 7/1994 | Kurose | |
| 5,470,158 A | 11/1995 | McLarty et al. | |
| 5,531,525 A | 7/1996 | Hida et al. | |
| 5,649,772 A | 7/1997 | Schlereth et al. | |
| 6,742,782 B1 * | 6/2004 | Beichl | 277/409 |
| 6,776,531 B1 * | 8/2004 | Tsuchida et al. | 384/484 |

\* cited by examiner

*Primary Examiner*—Thomas R. Hannon
*Assistant Examiner*—Colby Hansen
(74) *Attorney, Agent, or Firm*—Foley & Lardner LLP

(57) ABSTRACT

A rolling bearing with shield plate comprises an outer ring having an outer ring raceway and a circumferential anchor groove, the anchor groove provided at an axial end portion separated from the outer ring raceway and having an outside facing side surface, an inner ring having an inner ring raceway, a plurality of rolling members between the outer ring raceway and the inner ring raceway, and a shield plate in a generally circular ring shape provided with an inside facing, radially outer portion and an outer peripheral edge portion which is anchored in the anchor groove of the outer ring, the shield plate having an elastic seal member attached generally circumferentially and radially inner than the outer peripheral edge portion of the shield plate, such that the seal member is elastically held between the shield plate and the anchor groove.

28 Claims, 22 Drawing Sheets

ROLLING BEARING UNIT WITH SHIELD PLATE

The present application is a Continuation of U.S. application Ser. No. 09/503,489, filed Feb. 14, 2000, which is a continuation-in-part of U.S. application Ser. No. 09/060,976, filed Apr. 16, 1998, now abandoned, the entire contents of which are incorporated herein by reference.

FIELD OF THE INVENTION

The present invention is related to a rolling bearing unit with a shield plate which is utilized to support the spindle of the electric motor installed in a magnetic disc drive apparatus such as a hard disc drive apparatus (HDD) or flexible disc drive apparatus (FDD), or to rockingly support a swing arm to support a head.

BACKGROUND OF THE INVENTION

As disclosed e.g. in Japanese Patent Publication Toku Kai Hei No. 7-111053, the hard disc drive apparatus to be used as a memory or storage device for computers etc. has a structure as shown in FIG. 23. The hard disc drive apparatus comprises a hard disc 1, a swing arm 3 with a head 2 at the tip end thereof and a rolling bearing 4 as shown e.g. in FIG. 24. The hard disc 1 is rotated at a high speed by an electric motor of the direct drive type when the hard disc drive apparatus is used. This electric motor has a drive shaft, which is a base end portion of the swing arm 3 with the head 2. The drive shaft of the electric motor or the base end portion of the swing arm 3 is supported by the rolling bearing 4 so as to be rotated with reference to the motor case or to be rockingly displaced with reference to the support shaft.

The rolling bearing 4 comprises an outer ring 6 having an inner peripheral surface on which an outer ring raceway 5 is formed, an inner ring 8 having an outer peripheral surface on which an inner ring raceway 7 is formed, a plurality of rolling members 9 rotatably provided between the outer ring raceway 5 and the inner ring raceway 7, and a pair of shield plates 11 each provided on either side of the rolling bearing 4.

The rolling bearing 4 is formed with a space 14 between the inner peripheral surface of the outer ring 6 and the outer peripheral surface of the inner ring 8 to accommodate the rolling members 9 therein, and the shield or seal plates 11 as shown in FIGS. 24 and 25 and in FIGS. 26 to 28 are conventionally used in order to close the opening at either axial end of the space 14.

The rolling members 9 are arranged in a circumferential direction and supported by a cage 10, which is e.g. of a corrugated type made of a metal or of a crown type made of synthetic resin. The shield plates 11 have an outer peripheral edge portion which is anchored on the inner peripheral surface at either axial end portion of the outer ring 6, and an inner peripheral edge portion located close to the outer peripheral surface at either end portion of the inner ring 8, so that the space portion accommodating the rolling members 9 is isolated from outside.

In the rolling bearing 4 illustrated in FIG. 24, the outer ring 6 is formed with an anchor groove 12 on the inner peripheral surface at either axial end thereof, and the shield plates 11 are fixed to the outer ring 6 by crimping the outer peripheral portion thereof into the anchor grooves 12. Specifically, the shield plates 11 are made of a metal sheet in a generally circular ring shape, and the outer peripheral edge portion of the shield plates 11 is formed with a lapel portion 13 in a substantially semicircular shape in cross section. The lapel portion 13 is then positioned on the radially inner side of the groove 12, and in this state, plastically deformed radially outwards, that is widened by crimping. Consequently, the outer peripheral portion of the shield plates 11 is anchored in the groove 12 as shown in FIGS. 24 and 25.

The seal plates 11a in FIG. 26 comprises an elastic member 15a such as rubber and a metal member 16a for reinforcement on the inside of the elastic member 15a while the seal plate 11b in FIG. 27 comprises an elastic member 15b such as rubber and a metal member 16b for reinforcement on the outside of the elastic member 15b. The outer peripheral edge portion of the elastic member 15a in the seal plate 11a is projected radially outward from the outer peripheral edge of the metal member 16a with this projected portion anchored by way of its elasticity into the groove 12 on the inner peripheral surface at the axial end of the outer ring 6 while the outer peripheral edge portion of the elastic member 15b in the seal plate 11b is projected radially outward from the outer peripheral edge of the metal member 16b with this projected portion anchored by way of its elasticity into the groove 12 on the inner peripheral surface at the axial end of the outer ring 6. Thus, the seal plates 11a, 11b are anchored on the inner peripheral surface at the axial end of the outer ring 6, respectively.

The seal plate 11c in FIG. 28 is made of a metal sheet and formed with a lapel portion 13a along the outer peripheral edge portion thereof, and an elastic member 17 made of organic material such as rubber, elastomer is attached to the substantially whole outer peripheral surface of the portion lapel 13. In the state where the outer peripheral edge portion of the seal plate 11c is anchored in the groove 12 on the inner peripheral surface at the axial end of the outer ring 6, the elastic member 17 is elastically compressed between the outer peripheral surface of the lapel portion 13a and the inside surface of the groove 12 to seal between the outer and inner peripheral surfaces.

Some improvements are required in the conventional rolling bearings with shield plate having shield or seal plates as shown in FIGS. 24 to 28 (depicted by 11, 11c, 11a, 11b) as follows;

In the structure as illustrated in FIGS. 24 and 25, the seal performance between the outer peripheral edge portion of the shield plate 11 and the inside surface of the groove 12 is not sufficient, so that the grease and the base oil component of the grease filled in the space 14 may leak out through the seal portion between the outer peripheral edge portion of the shield plate 11 and the inside surface of the groove 12. Specifically, a minute clearance may exist due to the metal to metal contact relationship between the outer peripheral edge portion of the shield plate 11 and the inside surface of the groove 12. In addition, discontinuity portions 27 exist as shown in FIGS. 11, 13 in the midway of the lapel portion 13, and therefore any clearance is unavoidably produced. Consequently, the grease and/or the base oil component of the grease may leak out of the rolling bearing installed in the HDD or FDD through the minute clearance etc., and contaminate the installation space of the HDD or FDD which must be kept clean because the hard disc is installed therein. This may lead to malfunction of the computer devices with the HDD or FDD installed therein. This is not desirable.

In the case of the structures as shown in FIGS. 26 to 28, the grease and/or the base oil component of the grease is effectively prevented from leaking out of the rolling bearing having the shield plates, but on the other hand, debris of the elastic member may fly into the installation space which must be clean for the hard disc installed therein. Specifically, in the structures as shown in FIGS. 26 to 28, part of the elastic member (15a in FIG. 26, 15b in FIG. 27, and 17 in FIG. 28) of the shield or seal plate is exposed to the outside of the space 14. And when the outer peripheral edge portion of the shield or seal plate (11a in FIG. 26, 11b in FIG. 27, and 11c in FIG. 28) is fitted into the groove 12, the part of the elastic member may be broken to produce debris, which may contaminate the installation space which must be clean for the hard disc installed therein. When the elastic member is made of rubber, the additives or vulcanization agents contained in the rubber will contaminate the installation space. This is called chemical contamination. The utilization of fluorinated rubber for the elastic member or secondary vulcanization may solve the problems of the chemical contamination in a degree, but increase the material cost and process cost.

SUMMARY OF THE INVENTION

An object of the present invention is to provide a rolling bearing unit with shield plate by which the problems as mentioned above are solved.

Another object of the present invention is to provide an inexpensive rolling bearing unit with shield plate where any contaminants are prevented from entering e.g. the installation space to be kept clean for the hard disc.

DETAILED DESCRIPTION OF THE PREFERRED EMBODIMENTS

Figure 1:
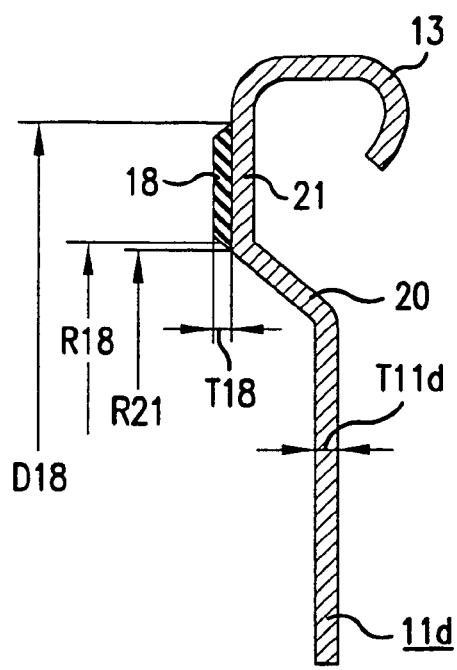
FIG. 1 is a cross sectional view of an example of the embodiments of the shield plate according to the present invention, where only the cross section areas are illustrated.

The rolling bearing with shield plate of the present invention comprises, as in the conventional structures as previously mentioned, an outer ring 6 having an inner peripheral surface on which an outer ring raceway 5 is formed, an inner ring 8 having an outer peripheral surface on which an inner ring raceway 7 is formed, a plurality of rolling members 9 rotatably provided between the outer ring raceway 5 and the inner ring raceway 7. A pair of anchor grooves 12 is provided at the axial end portions of the outer ring 6 at an axial portion separated from the outer ring raceway generally circumferentially on the inner peripheral surface, and a pair of shield plates is formed in a generally circular ring shape and provided with an outer peripheral edge portion anchored in the anchor groove on the inner peripheral surface of the outer ring 6 at the axial ends thereof.

Particularly in the rolling bearing of the present invention, an elastic seal member 18 is attached to the inside surface of the shield plates generally circumferentially at a radially outer portion of the shield plates slightly radially inner than the outer peripheral edge of the shield plates. In the state where the shield plate is anchored in the groove 12, the seal member 18 is elastically held between the radially outer portion of the inside surface of the shield plate and the outside facing side surface of the anchor groove 12. Desirably, part of the anchor groove 12 is formed with a generally circumferential end edge portion which encroaches into part of the seal member 18, preferably widthwise central portion of the seal member 18.

In the rolling bearing with shield plate of the present invention, the seal member 18 prevents the grease and/or the base oil component of the grease from leaking out of the space 14 where the rolling member are accommodated. In addition, the seal member 18 elastically held between the shield plate 11d and the side surface 19a of the anchor groove 12 is not exposed to outside. Therefore, it is prevented that, for example, debris is produced and separated from the rolling bearing and that contaminants such as debris go out, for example, to the installation space where the rolling bearing is installed.

Figure 2:
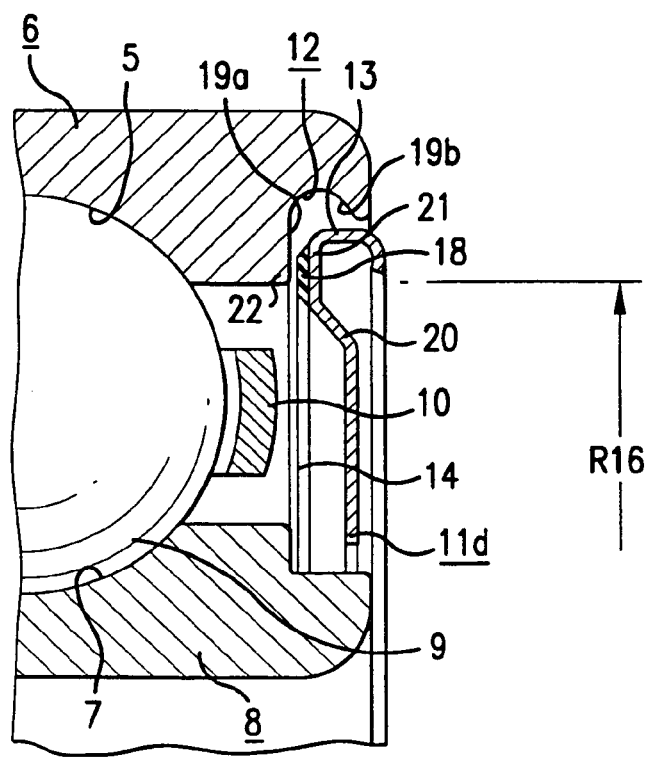
FIG. 2 is a cross sectional view of part of the rolling bearing just before the shield plate of FIG. 1 is installed therein.
Figure 3:
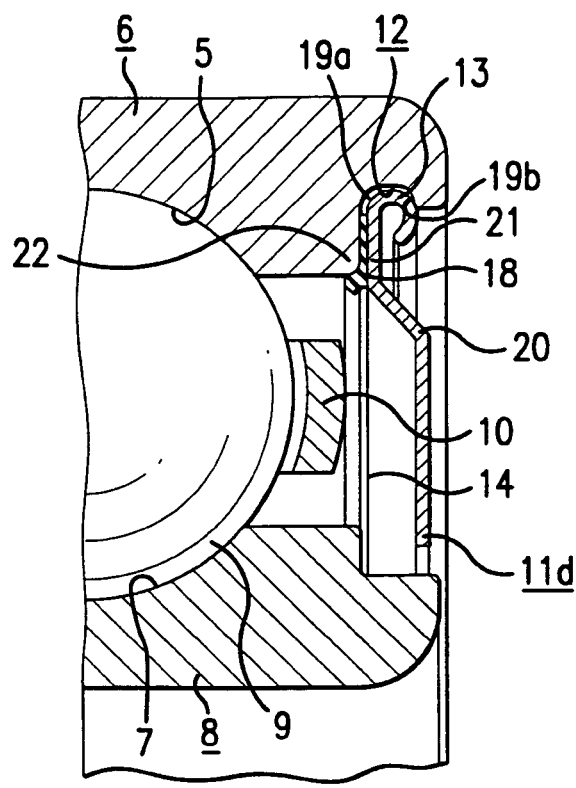
FIG. 3 is a cross sectional view of the part of the rolling bearing of FIG. 2 where the shield plate is installed therein.

FIG. 1 to FIG. 3 show a first embodiment of the shield plate of the present invention, where only one side portion of the rolling bearing is illustrated in FIG. 2. This invention is characterized in the structure wherein the sufficient seal performance of the engagement section between the outer peripheral edge portion of the shield or seal plate lid and the anchor groove 12 formed on the inner peripheral surface of the either end of the outer ring 6 in order to anchor or moor the shield plate 11d to prevent contaminants such as debris of seal member 18 attached on the engagement section from getting out of the rolling bearing with shield plate. The structure and function of the other portions are substantially the same as those of the prior art rolling bearing with shield plate mentioned above, then, the explanation on them is omitted or simplified here, and the characteristics of this invention will be mainly given below.

The shield plate 11d is made of metal sheet such as stainless steel or non-metal sheet such as synthetic resin, and is formed in a generally annular shape, with a lapel portion 13 having a substantially semi-circular shape in cross section and formed along the outer peripheral edge portion of the shield plate 11d. On the other hand, there is a anchor groove 12 formed on the inner peripheral surface of the either end of the outer ring 6, which is to be fitted with the outer peripheral edge of the shield plate 11d. The anchor groove 12 is defined by a pair of side surfaces 19a and 19b on its right and left sides. Of these side surfaces, the inside side surface 19a closer to the outer ring raceway 5 is made taller (larger in width in the radial direction of the outer ring 6) than the outside side surface 19b closer to the end face of the outer ring 6. The inside side surface 19a faces axially outside and the outside side face 19b faces axially inside in the rolling bearing.

In order to install the shield plate 11d on such anchor groove 12 as mentioned above, the lapel portion 13 is placed in alignment with the opening portion on the radially inner side of the anchor groove 12, and then collapsed through plastic deformation in the width direction to make its diameter larger (crimping it wider) so as to engage the lapel portion with the anchor groove 12.

The shield plate 11d has a flat portion 21 on its radially middle portion at a location closer to the outer periphery, specifically, the flat portion 21 is located between a slope portion 20 formed on the radially middle portion of the shield plate 11d and the lapel portion 13. The slope portion 20 is formed in a step shape. The inner diameter $R_{12}$ of the flat portion 21 is made smaller than the inner diameter $R_6$ of the outer ring 6. A seal member 18 made of organic elastic material having heat resistance and oil resistance is attached to the inside surface (left side in FIGS. 1~3) of the flat portion 21 which faces inside in the rolling bearing. The inner diameter $R_6$ of the outer ring 6 is smaller than the outer diameter $D_{18}$ of the seal member 18, and larger than the inner diameter $R_{18}$ of the seal member $18 (D_{18} > R_6 > R_{18} > R_{21})$. Accordingly, in the state where the shield plate 11d is anchored on the groove 12, the seal member 18 is held elastically between the inside surface of the flat portion 21 of the shield plate 11d and the inset, outside facing side surface 19a of the anchor groove 12. In addition, the peripheral edge portion 22 of the anchor groove 12 at the opening encroaches upon an abutting portion of the seal member 18.

In the case of the present invention structured as mentioned above, the seal member 18 elastically held between the inside surface of the flat portion 21 and the outside facing side surface 19a of the anchor groove 12 prevents the grease and/or the base oil component of the grease from leaking out of the space 14 between the inner peripheral surface of the outer ring 6 and the outer peripheral surface of the inner ring 8, where the rolling members are accommodated. Specifically, the surface pressure against the portion of the seal member 18 abutting the edge portion 22 is high enough to produce a sufficient seal performance. As a result, the base oil component even of low viscosity can be effectively prevented from leaking out.

The anchor groove 12 in which the outer peripheral edge portion of the shield plate 11d is anchored, and the outer ring raceway 5 along which the rolling members move are both manufactured at the same time in lathing process by the forming tools having the shape corresponding to both the anchor groove 12 and the outer ring raceway 5. Therefore, the side surface 19a of the anchor groove 12 is not actually made in the vertical wall as shown in FIG. 2 and FIG. 3, but is slightly inclined (at the angle θ in FIG. 14) with reference to the surface orthogonal to the central axis as shown in a fourth embodiment of this invention in FIGS. 8 to 16. This angle of inclination (θ) is generally in the range of from 0 to 15 degrees, and preferably restricted in the range of from 5 to 10 degrees. When the flat portion 21 of the shield plate 11d is pressed against the side surface 19a inclined as mentioned above through the elastic seal member 18, the seal member 18 of elastic material, being pressed between the side surface 19a and the flat portion 21, flows to the opening side or on the inner diameter side of the anchor groove 12, As a result of this flow, the volume of the seal member 18 is fixed at this area and the thickness of the seal member 18 becomes uniform. In order to make thus the thickness of the seal member 18 uniform, in a practical case, the flat portion 21 to which the seal member 18 is applied is also inclined in the same direction as the side surface 19a as shown in a fourth embodiment of this invention in FIGS. 8 to 16. It is desirable to make the angle of inclination of the flat portion 21 a little larger (θ+α in the FIG. 14) than that of the side surface 19a. The degree of this surplus angle α is desirably in the range of from 0 to 5 degrees.

Figure 4:
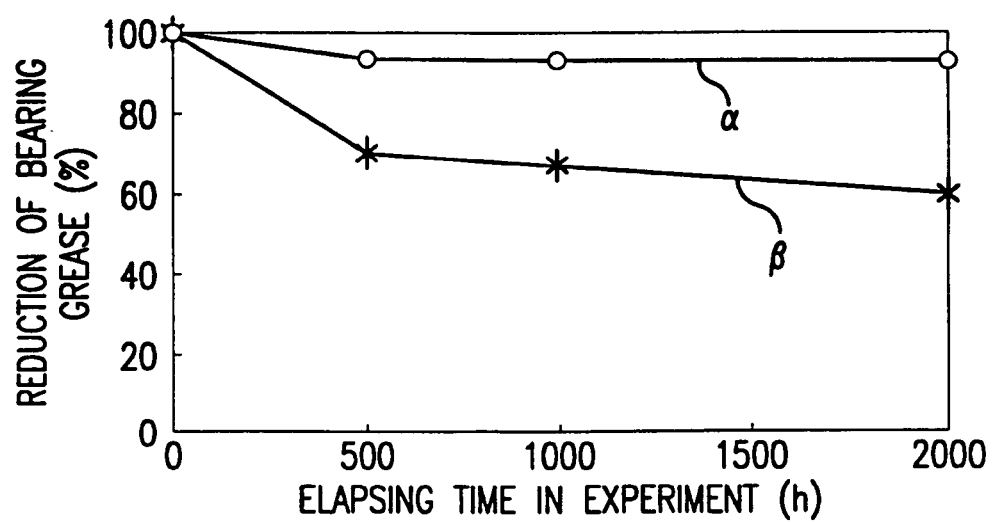
FIG. 4 is a graph showing a relation between the reduction in amount of bearing grease and the elapsing time in experiment.
Figure 24:
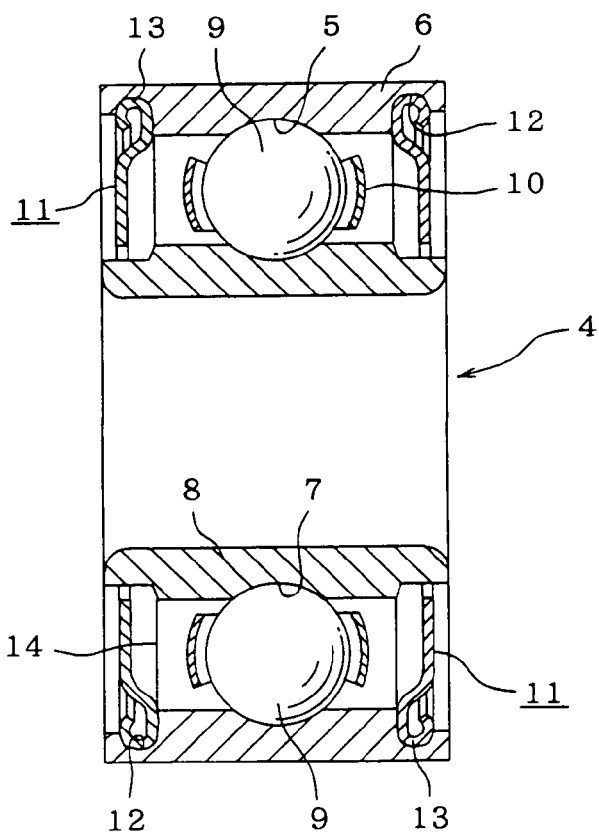
FIG. 24 is a cross sectional view of an example of the conventional rolling bearing unit to which the shield plate of the present invention can be applied.
Figure 25:
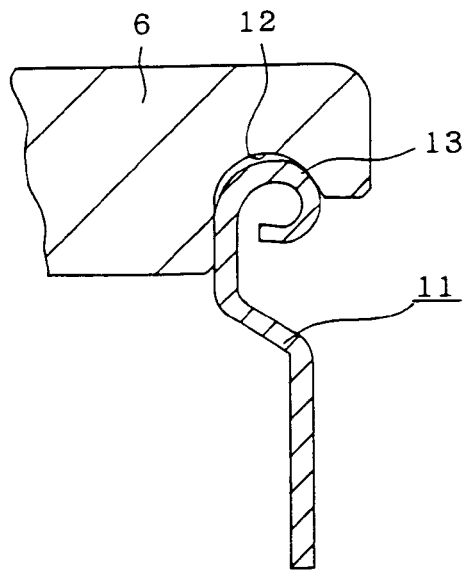
FIG. 25 is a cross sectional view to show a conventional structure corresponding to the upper right portion of FIG. 24.
Figure 26:
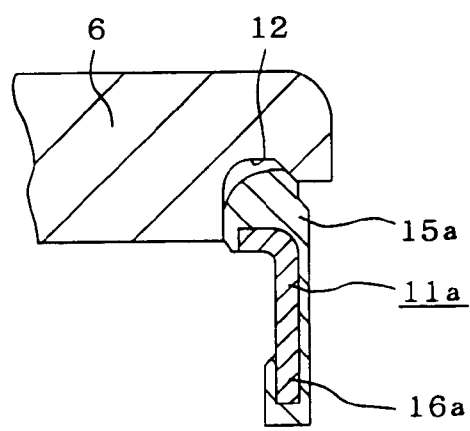
FIG. 26 is a cross sectional view to show another conventional structure corresponding to the upper right portion of FIG. 24.
Figure 27:
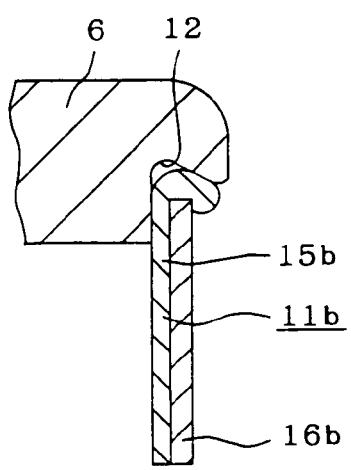
FIG. 27 is a cross sectional view to show another conventional structure corresponding to the upper right portion of FIG. 24.
Figure 28:
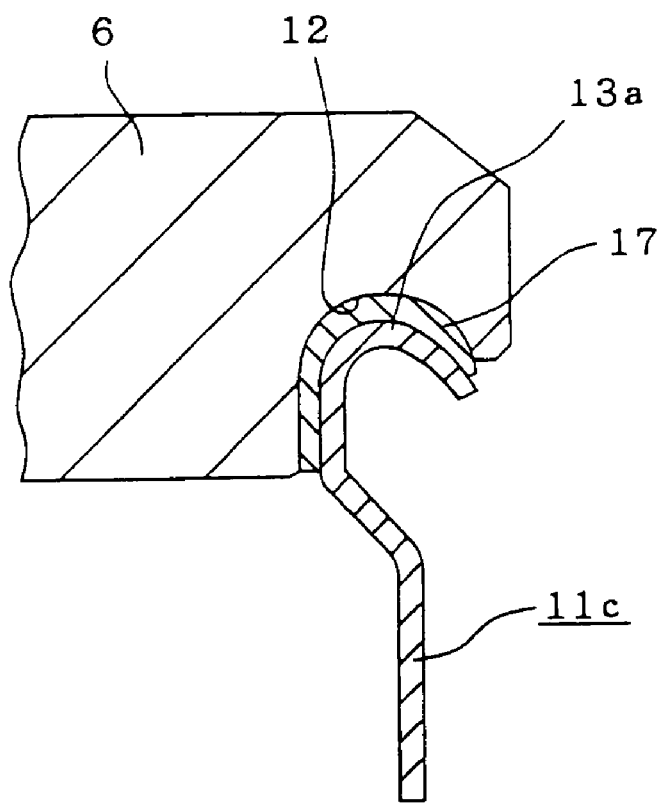
FIG. 28 is a cross sectional view to show another conventional structure corresponding to the upper right portion of FIG. 24.

FIG. 4 shows a result of the test the inventor has made to confirm the effect of this invention to prevent oil leakage. The test was done using a rolling bearing of a deep groove type, whose inner diameter is 5 mm and whose outer ring is, on its both edge portions of the inner peripheral surface, fitted with a shield plate. The ordinate of FIG. 4 indicates the proportion that the grease filled in the space between a pair of shield plates decreases as experiment time goes by, and the abscissa indicates elapsing time in this test. The curve α linking the marks [o] is for the rolling bearing with shield plate of the present invention as shown in FIGS. 1~3, and the curve β linking the marks [*] is for the conventional rolling bearing with shield plate as shown in FIGS. 24 and 25. This test has been done at the environmental temperature of 70° C., keeping the outer ring rotating at 10,000 r.p.m., and using NS HI-LUBE grease [=MULTEMP SRL grease (Kyodo Yushi Co. Ltd.).] As obviously represented by the result of the test in FIG. 4, in the case of the rolling bearing with shield plate of the present invention, leakage of the grease and/or the base oil components of the grease can be effectively controlled, so as to prevent all kinds of inconveniences due to oil leakage from occurring. At the same time, by controlling decrease in the grease and/or the base oil component of the grease, the lubricating efficiency of the rolling bearing will be maintained over a long period, so that the durability of the rolling bearing with shield plate itself as well as devices with the rolling bearing installed therein, e.g. HDDs, can be improved.

In addition, the seal member 18 is elastically held between the flat portion 21 of the shield plate 11d and the side surface 19a of the anchor groove 12, and not projecting out of the rolling bearing. Accordingly, debris or the like can be prevented from occurring or separated from part of the seal member 18 and are not likely to be a cause of contamination in the installation space where the rolling bearing with shield plate is installed. Consequently, all kinds of inconveniences due to contaminants other than the base oil component of the grease, such as the debris of the seal member, can also be avoided effectively.

The material and the thickness of the seal member 18 will be determined as a design matter according to the size etc. of the rolling bearing to which the shield plate 11d is fitted. Suitable materials for the seal member 18 are based on epoxy resin, polyurethane resin, reactive acrylic resin, polyester resin, vinyl-ether resin, which cure in polymerizing reaction by heat or light. Specifically, in the practice of the present invention, a resin having a viscosity in the range of 8,000±2000 cPs (at 25° C.) is selected from the above mentioned resins for use. Since the viscosity is influenced by the temperature, the resin applied has a tendency to heap up when the environmental temperature thereof is lower with respect to the room temperature at which it is generally utilized, and on the contrary become flat when the environmental temperature is higher. Therefore, it is possible to regulate the thickness of the seal member 18 by setting appropriate environmental temperature during operations.

In the case of e.g. the resin which cures by ultraviolet rays, by lowering the environmental temperature of the resin applied to the shield plate 11d before irradiation of ultraviolet rays, the degree at which the resin is heaped up can be regulated so as to be made thicker with a smaller amount of resin. Specifically, in the case of the resin which cures by ultraviolet rays, the maximum thickness of the resin through which ultraviolet rays can transmit is 3 mm. Therefore, the thickness of the ultraviolet ray curing resin applied on the flat portion 21 of the shield plate 11d is desirably in the range of from 0.02 mm to 0.5 mm, and more desirably in the range of from 0.04 mm to 0.2 mm. The same thing can be said in the case where the resin which cure by heat is utilized as the seal member 18.

In the case of the resin which cure by ultraviolet rays, and when the resin applied is cured by the irradiation of ultraviolet rays in the atmosphere, the surface of the cured resin becomes adhesive. By making use of this adhesiveness, the seal performance between the seal member 18 applied on the flat portion 21 of the shield plate 11d and the side surface 19a of the anchor groove 12 can be improved.

On the other hand, it is possible to obtain a cured seal member 18 with smooth surface by the irradiation of ultraviolet rays in the nitrogen environment. In the case of such shield plate 11d with a seal member 18 of smooth surface, the handling of the automatic devices for fitting the shield plate 11d into the anchor groove 12 goes smoothly.

Moreover, it is also possible to add a substance not having affinity for oil, e.g. fluorine, in order to strengthen the non-affinity of the seal member. In any case, the preferable hardness of the organic elastic material forming the seal member 18 in the completely cured state is in the range of from 30 to 85 at Japanese Industrial Standards (JIS). In the case where the structure shown in FIG. 1 to FIG. 3 is utilized, that is, in the structure of anchoring or mooring the outer peripheral edge of the shield plate 11d on the groove 12 by crimping the lapel portion 13 wider, it is preferable to make the thickness of the seal member 18 ($T_{18}$ in FIG. 1) in the free state (the state where the shield plate 11$d$ is not yet fitted into the outer ring 6) in the range of from 0.3 to 1.5 times the thickness of the metal plate ($T_{11d}$ in FIG. 1) forming the shield plate 11$d$ {$T_{18}$=(0.3~1.5) $T_{11d}$}. With the seal member 18 of the thickness in such range above, the contact pressure at the abutting portion of the peripheral edge portion 22 of the anchor groove 12 against the seal member 18 will be regulated in the appropriate range, so that a high degree of seal performance and durability of the seal member 18 can be both achieved at the same time.

Figure 5:
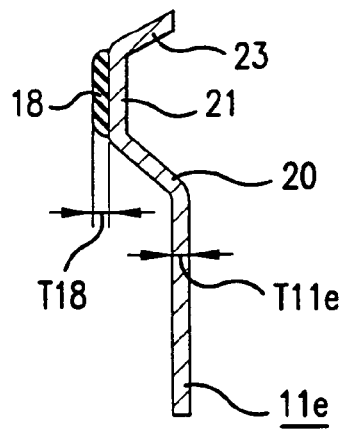
FIG. 5 is a cross sectional view of another example of the embodiments of the shield plate according to the present invention, where only the cross section areas are illustrated.
Figure 6:
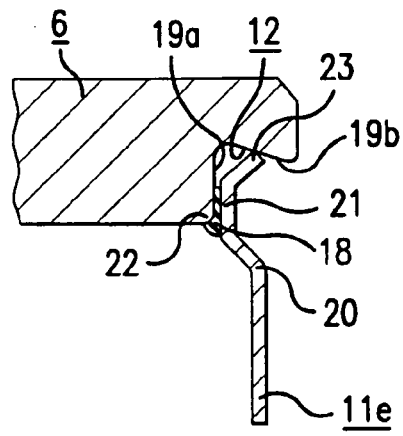
FIG. 6 is a cross sectional view of part of the rolling bearing in which the shield plate of FIG. 5 is installed, where only the cross section areas are illustrated.

FIG. 5 and FIG. 6 illustrate a second embodiment of the present invention, where the elastic sloping portion 23 is formed on the outer peripheral edge portion of the shield plate 11$e$, and the outer peripheral edge portion of shield plate 11$e$ is anchored in the groove 12 on the inner peripheral surface of the outer ring 6 at the end thereof, based on the elastic deformation of the elastic sloping portion 23. In the case where the structure of this example is utilized, it is preferable to make the thickness of the seal member 18 on the inside surface of the flat portion 21 ($T_{18}$) in the free state in the range of from 0.2 to 1.2 times the thickness of the metal plate ($T_{11e}$) forming the shield plate 11$e$ {$T_{18}$=(0.2~1.2) $T_{11e}$}. The other construction and operation are substantially the same as those of the first embodiment.

Figure 7:
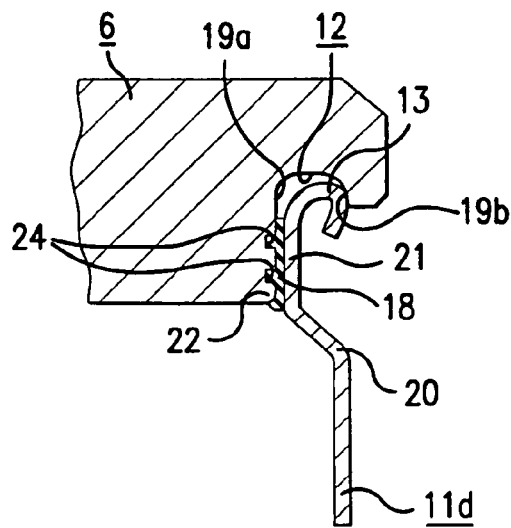
FIG. 7 is a cross sectional view of part of the rolling bearing in which another shield plate is installed, where only the cross section areas are illustrated.

FIG. 7 illustrates a third embodiment of the present invention, where the side surface 19$a$ of the anchor groove 12 on the inner peripheral surface of the outer ring 6 at the end thereof has at least one concavity or groove 24 (two concavities in the example illustrated) generally over its circumferential surface. In the state where the lapel portion 13 on the outer peripheral edge portion of the shield plate 11$d$ is anchored on the groove 12, part of the seal member 18 attached to the inside surface of the flat portion 21 of the shield plate 11$d$ enters into the concavities 24. As a result, the opening edge portion of each concavity 24 and the part of seal member 18 press each other with sufficiently high pressure over the circumferential surface thereof, so as to improve much more the seal performance of the engagement section of the shield plate 11$d$ and the outer ring 6. The other construction and operation are substantially the same as those of the first embodiment.

Figure 8:
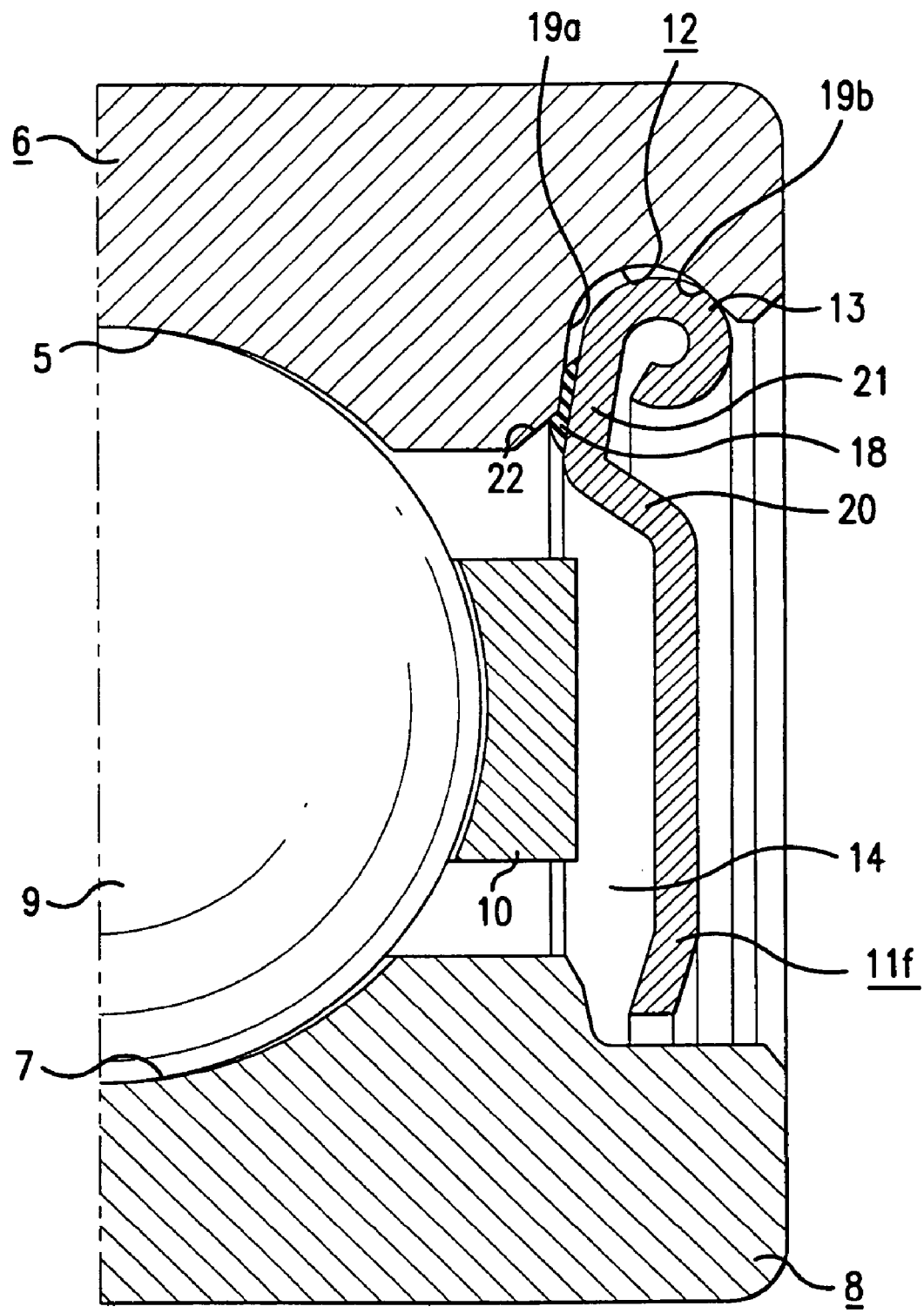
FIG. 8 is a cross sectional view of part of the rolling bearing where another shield plate is installed.
Figure 9:
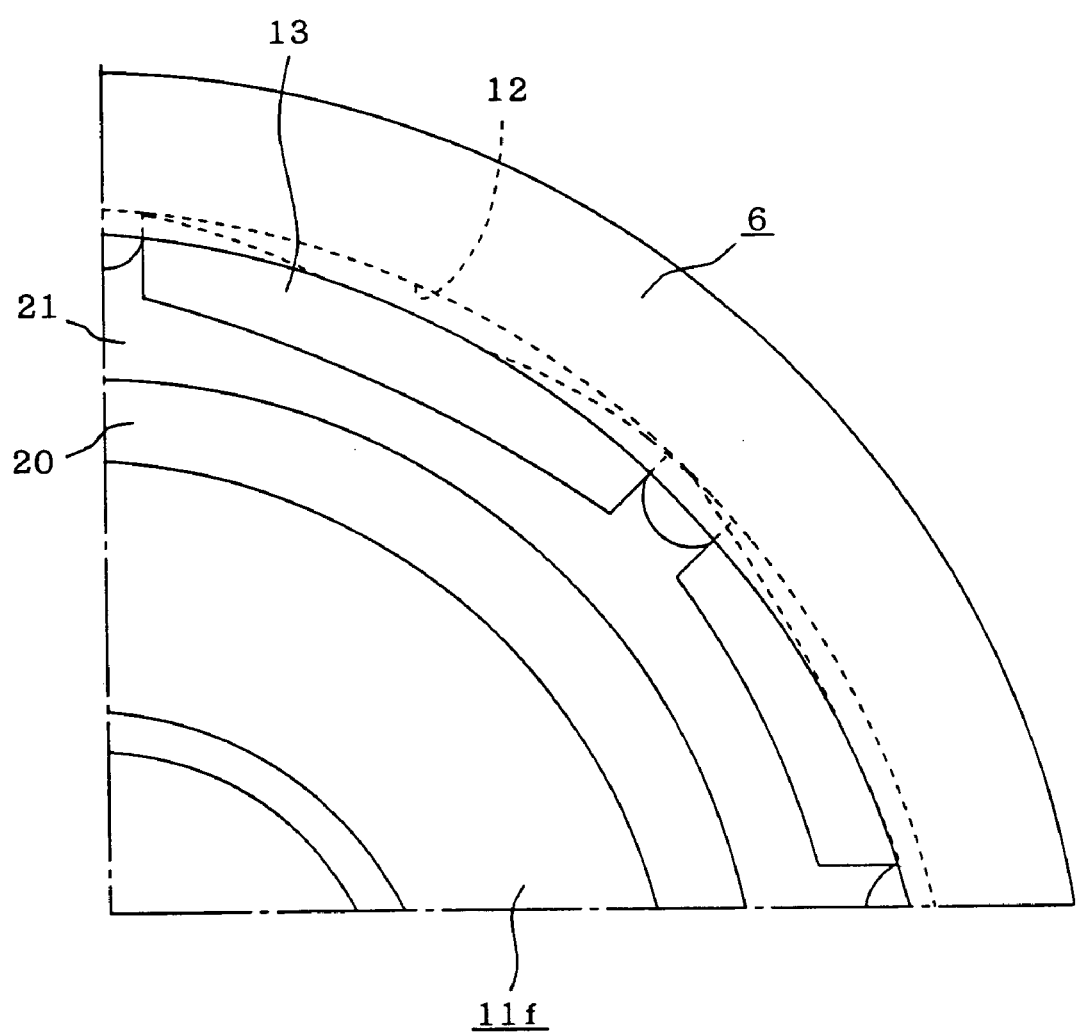
FIG. 9 is a right side elevational view of the structure of FIG. 8, where one quarter portion only is illustrated.
Figure 10:
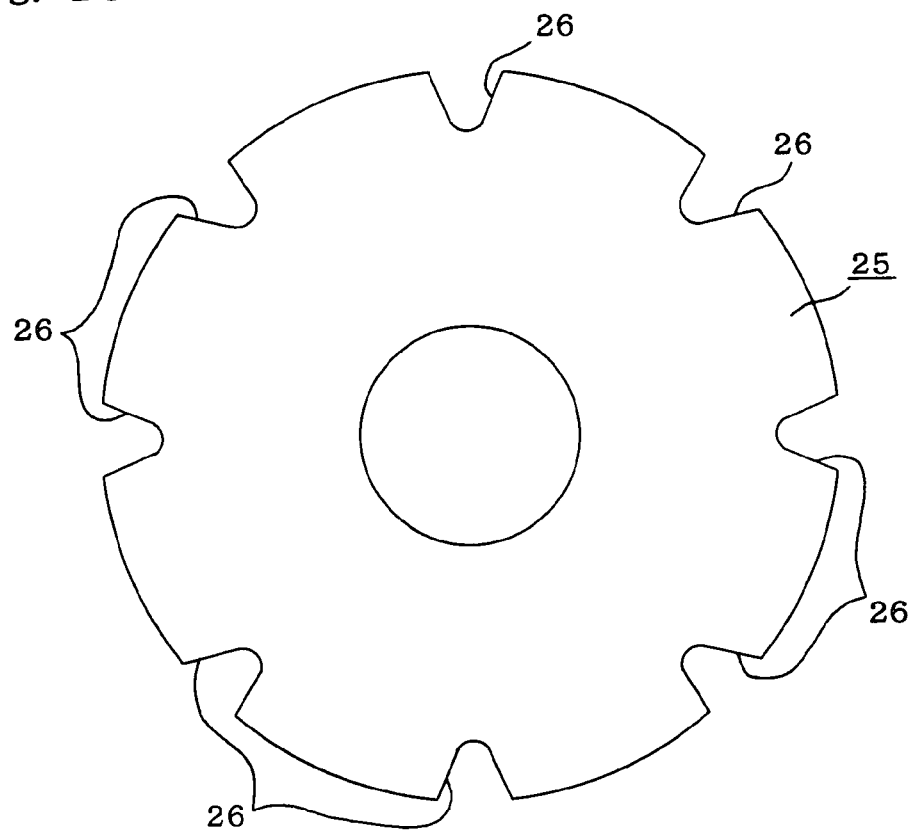
FIG. 10 is a side elevational view, in the idential direction to FIG. 9, of a blank for the shield plate.
Figure 11:
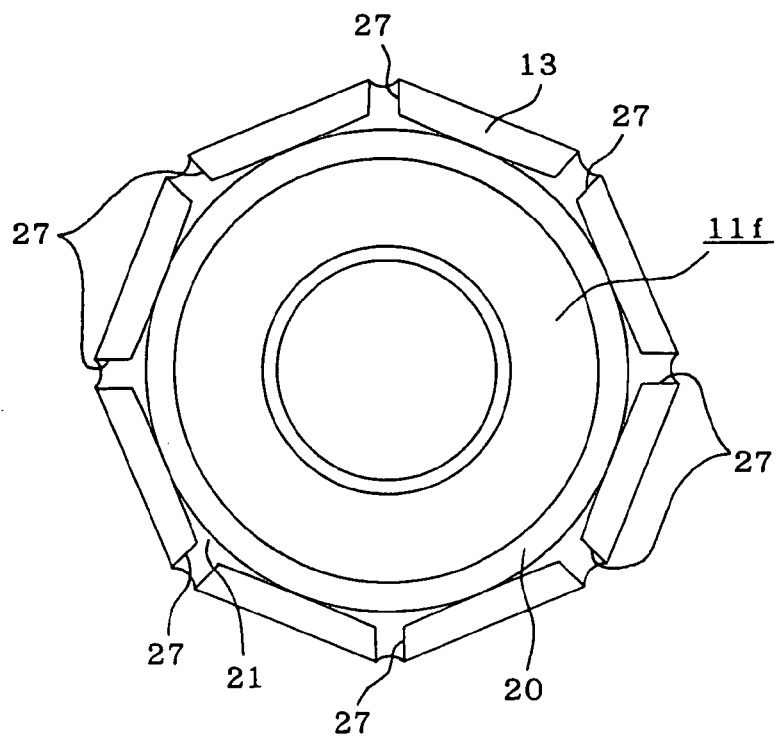
FIG. 11 is a side elevational view of the shield plate formed from the blank of FIG. 10.

FIG. 8 to FIG. 16 illustrate a fourth embodiment of the present invention, which give a more concrete example. In order to produce the shield plate 11$f$ for this example, in the first place, a metal plate is processed by press punching into a blank 25 as shown in FIG. 10. This blank 25 is of a generally annular shape, and has a plurality of substantially V-shaped cutouts 26 evenly spaced from each other in the circumferential direction on its outer peripheral edge portion. The lapel portion 13 is formed as shown in FIG. 11, 13, 14 and 15 by folding (curling) in the same direction the intermediate portions between the circumferentially adjacent cutouts 26. In this way, the blank 25 for the shield plate 11$f$ is formed with the lapel portion 13, the flat portion 21 and the sloping portion 20. In the case where the lapel portion 13 is formed in this way, a plurality of slit-like discontinued portions 27 are formed at the lapel portion 13 in the circumferential direction. The inclining angle of the cutouts 26 must be regulated in order to make the width of these discontinued portions 27 substantially uniform, so that the lapel portion 13 has a smooth shape forming a substantial equilateral polygon with the same number of angles as the cutouts 26. The number (n) of the cutouts 26 must be 4 or more (n≧4), and provided that Z stands for the number of rolling members in the rolling bearing to which the shield plate 11$f$ is fitted, the number equivalent to n=Z or Z ±1 must be excluded, and it is desirable to make it n≦2Z. The reason thereof is to prevent non-repetitive repetitive runout from occurring during operation of the rolling bearing with shield plate in spite of the fact that the installation of the shield plate 11$f$ causes minute deformation on the outer ring 6.

Figure 14:
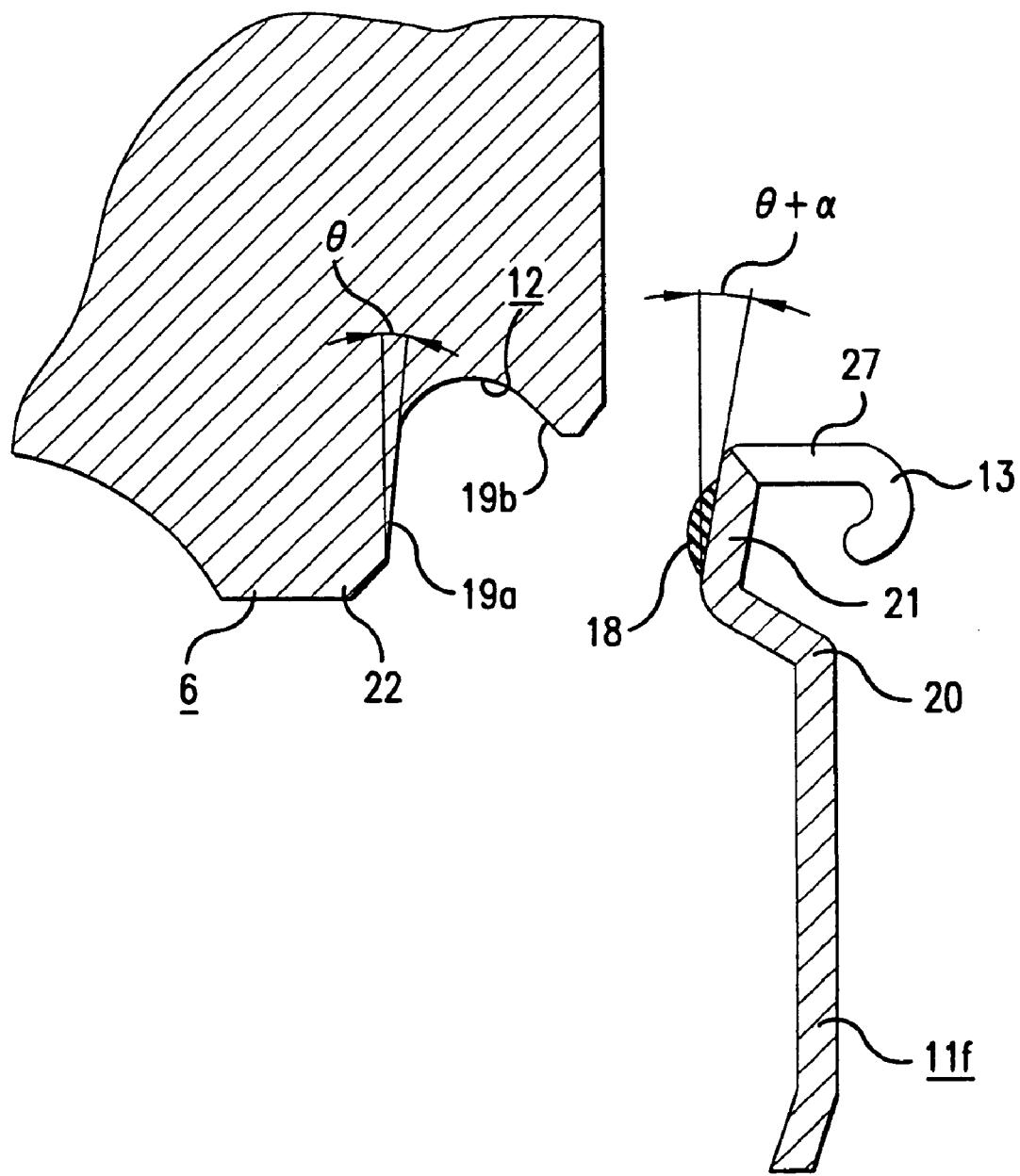
FIG. 14 is a cross sectional view of another example of the shield plate of the present invention just before mounted to the anchor groove of the outer ring, where only the cross section areas of the shield and anchor groove portion are illustrated.

To one side of the flat portion 21 of the shield plate 11$f$ constructed as mentioned above, that is to the opposite side of the lapel portion 13 (the left side in FIGS. 8 and 14), the seal member 18 is applied generally over its peripheral surface. The actual surface shape in cross section of this seal member describes an arc which has the thick middle portion becoming gradually thinner as it is closer to the both end portions as shown in FIG. 14. The position where such a seal member 18 is applied must be regulated so that the edge end portion 22 of the side surface 19$a$ of the anchor groove 12 comes on the widthwise central portion of the seal member 18 (up and down direction in FIG. 8). This is because a sufficient seal performance can be obtained by thus abutting the edge end portion 22 upon the thickest portion of the seal member 18.

Figure 12:
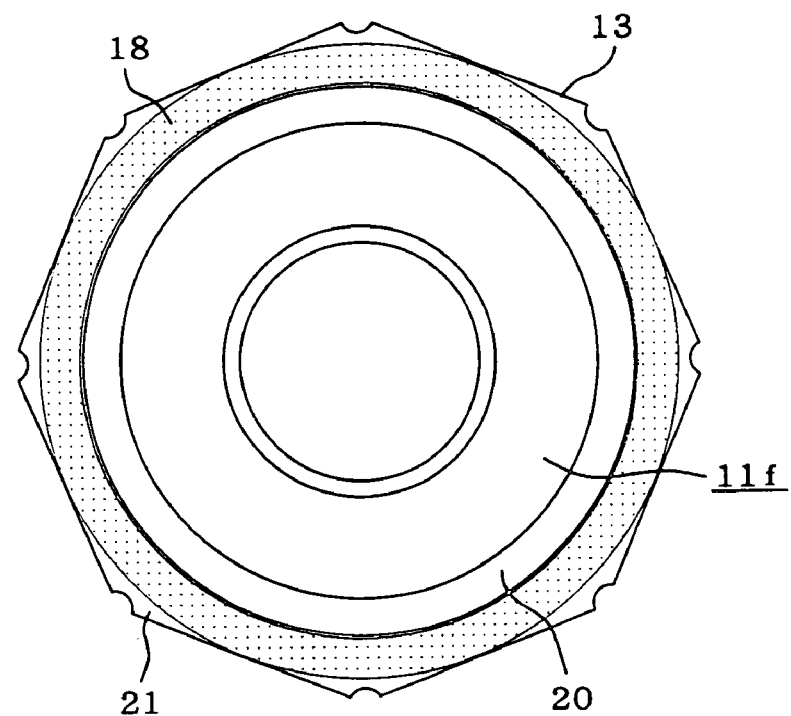
FIG. 12 is a side elevational view from the rear side of FIG. 11 where the seal member is ideally attached to the shield plate.
Figure 13:
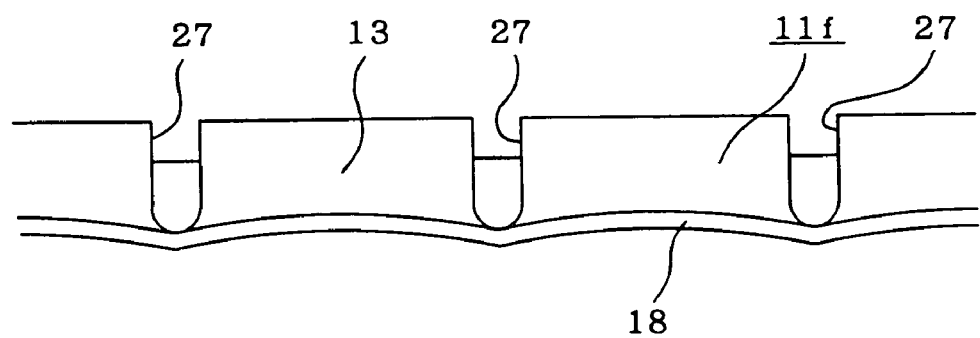
FIG. 13 is an enlarged partial development viewed from above of FIG. 12.
Figure 16:
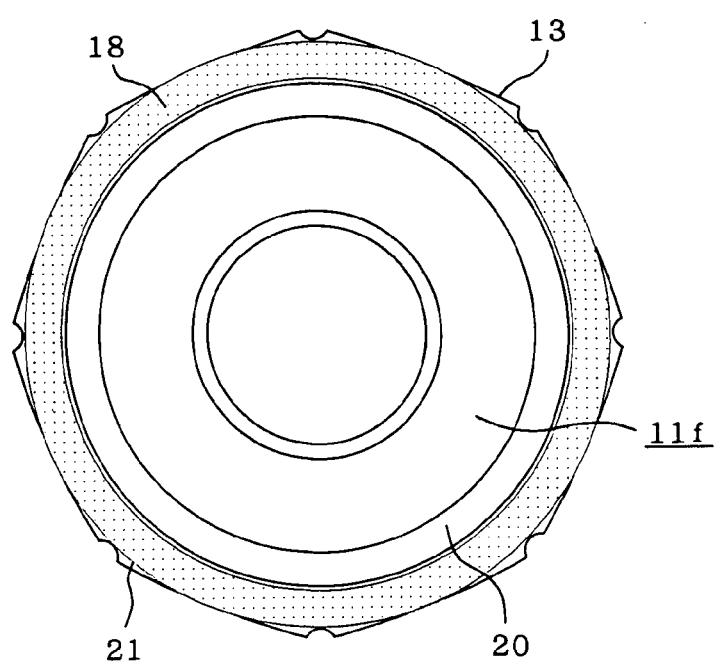
FIG. 16 is a side elevational view similar to FIG. 12 where an actual attachment state of the seal member is illustrated.

FIG. 12 illustrates the state where the seal member 18 is ideally applied to one side of the flat portion 21. In practice, however, the seal member 18 can not be applied ideally like this, but the width dimension is unavoidably varied in the circumsferential direction as shown in FIG. 16. In the actual case, the seal member 18 has a tendency to become wider at the portions around the slit-like discontinued portions 27 and narrower at the portions away therefrom. This variation in width of the seal member 18 in itself is not a material problem, but the material problem is a variation in thickness due to this. The seal member 18 becomes thinner on the wider portions and becomes thicker on the narrower portions. When such a variation in thickness becomes remarkable, it affects the seal performance of the seal member 18, accordingly, it is important to keep the application width of the seal member 18 uniform and keep the variation in thickness small. Viewed in this light, it is desirable to control the variation in width with respect to the ideal value up to 10%.

The thickness of the seal member 18 is determined taking the deformation of the shield plate 11$f$ into account so as to obtain the seal performance in the state where the shield plate 11$f$ is installed in the outer ring 9 as shown in FIG. 8. When the lapel portion 13 is formed through plastic deformation of the outer peripheral portion of the blank 25 in FIG. 10, it also cause a slight deformation on the flat portion 21 to be provided with a seal member 18 as exaggeratedly illustrated in FIG. 13, that is, the portions close to each discontinued portion 27 bend slightly in the convex shape and the portions away therefrom bend slightly in the concave shape. Accordingly, the lower limit of the thickness of the seal member 18 must be determined so that the seal member 16 on the most depressed portion at the center of the discontinued portions 27 can be elastically held by sufficient pressure between the flat portion 21 and the edge end portion 22 of the side surface 19$a$.

Figure 15:
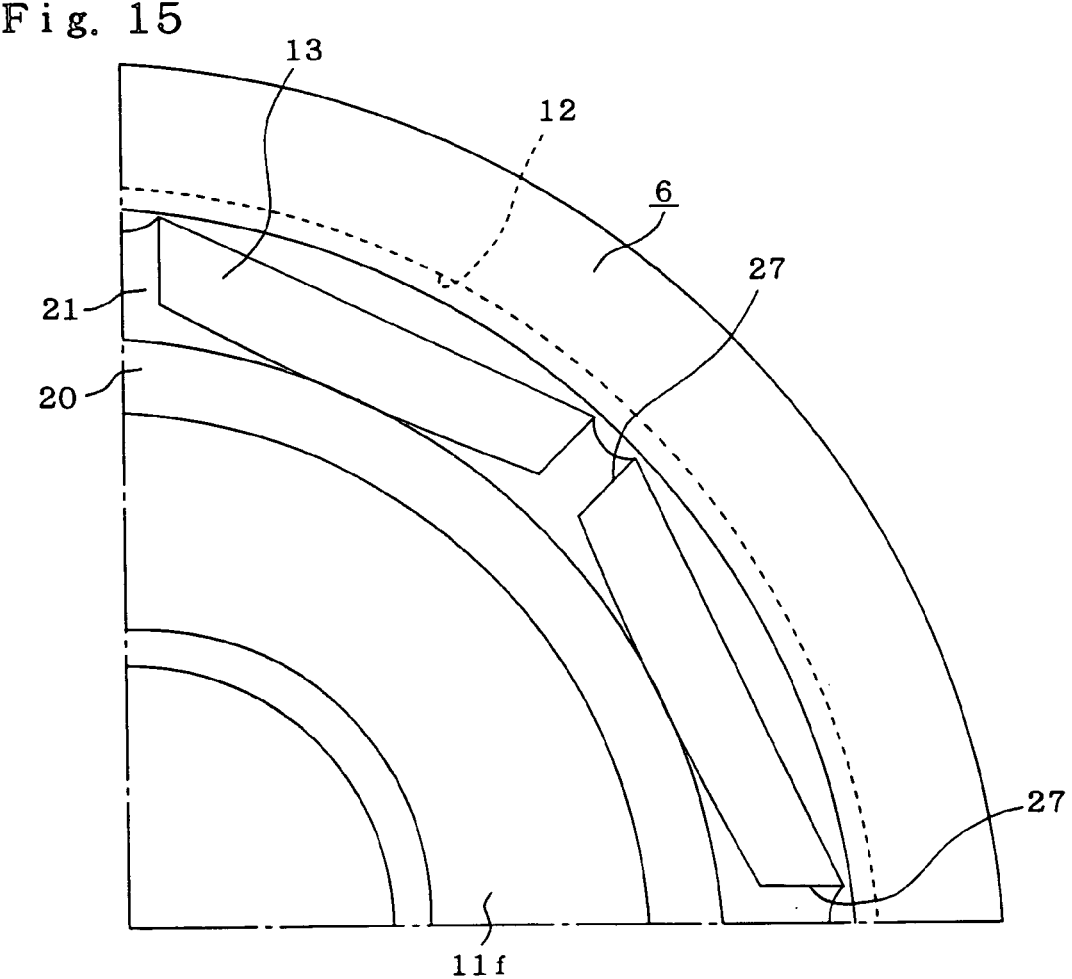
FIG. 15 is a right side elevational view of the structure of FIG. 14, where one quater portion only is illustrated.

The shield plate 11$f$ with the seal member 18 attached thereto as mentioned above goes through the processes as shown in FIG. 14 and FIG. 15, then is anchored in the groove 12 of the outer ring 6 of the rolling bearing at its both inner peripheral edge portions as in FIGS. 8 and 9. The outer diameter of the shield plate 11$f$ is the largest at the portions each including the discontinued portion 27. Accordingly, the upper limit of the outer diameter of this portion before being fitted in the groove 12 is made a little bit smaller than the inner diameter of the side surface 19$b$ of the anchor groove 12. The shield plate 11f is placed in alignment with the anchor groove 12 as shown in FIGS. 14 and 15, and the peripheral edge of the shield plate 11f after having been inserted into the groove 12, is collapsed through plastic deformation in the axial direction to make the outer diameter of the lapel portion 13 larger. By this operation, the lapel portion 13 is anchored in the grohove 12 as shown in FIGS. 8 and 9, and the widthwise center portion of the seal member 18 is pressed generally against the peripheral edge end portion 22 of the side surface 19a so as to seal between the shield plate 11f and the outer ring 6 to prevent contaminants, e.g. the grease or the base oil component of the grease, from leaking out.

Most of minute clearances between the shield plate 11f shaped as mentioned above and the anchor groove 12 of the outer ring 6 are produced at the discontinued portions 27 and at the center portions with a smaller diameter between the circumferentially adjacent discontinued portions 27. It is very difficult to do away at all with these clearances between the said portions and to prevent contaminants such as grease, debris from leaking thereout. However, the rolling bearing with shield plate of the present invention can prevent, regardless of the clearances, leakage of contaminants, because of the seal member 18 between the flat portion 21 of the shield plate 11f and the edge end portion 22 of the side surface 19a existing radially inner than the clearances. Thus, the present invention realize the rolling bearing with sufficient seal performance at a lower cost.

The following examples in FIGS. 17 to 22 have a second seal member 28.

Figure 17:
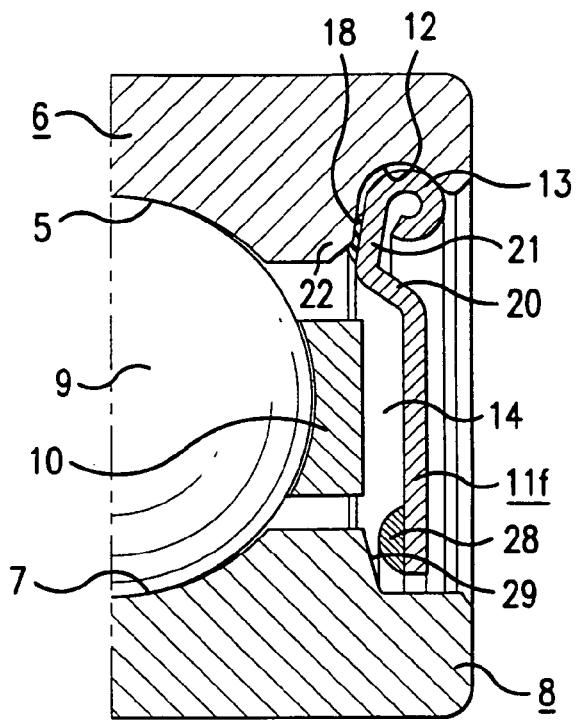
FIG. 17 is a cross sectional view similar to FIG. 3 to show another example of the embodiments of the present invention.

FIG. 17 shows a fifth example of the embodiments in the present invention, where the shield plate 11f has an inside surface to which the second seal member 28 is attached generally circumferentially at a location closer to the inner periphery of the shield plate 11f. The second seal member 28 has a tip end edge faced and located close to the step portion 29 on the outer peripheral surface of the inner ring 8.

Figure 18:
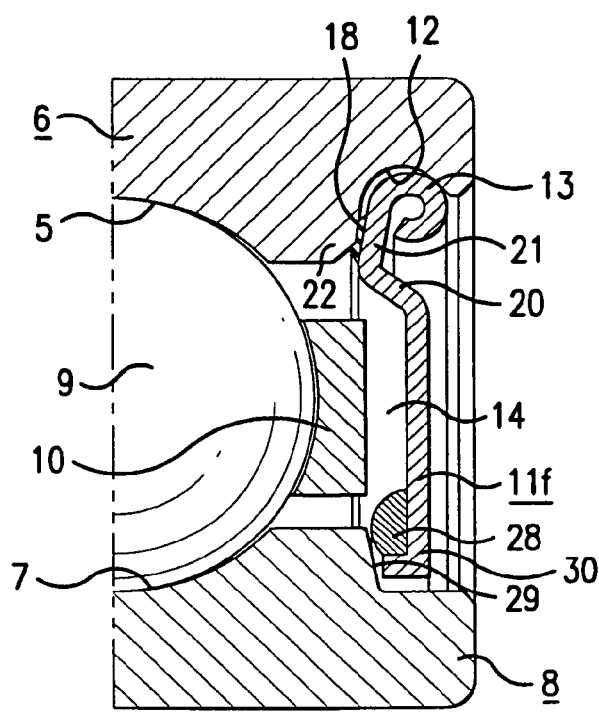
FIG. 18 is a cross sectional view similar to FIG. 3 to show another example of the embodiments of the present invention.

FIG. 18 shows a sixth example of the present invention, where the shield plate 11f has an inner peripheral edge portion which is formed with a bent portion 30. The bent portion 30 extends toward the step portion 29 formed on the outer peripheral surface of the inner ring 8. The second seal member 28 is attached to the inside surface of the shield plate 11f generally circumferentially at a location closer to the outer periphery of the step portion 29 and closer to the inner periphery of the shield plate 11f. The second seal member 28 has a tip end edge faced and located close to the step portion 29 on the outer peripheral surface of the inner ring 8.

Figure 19:
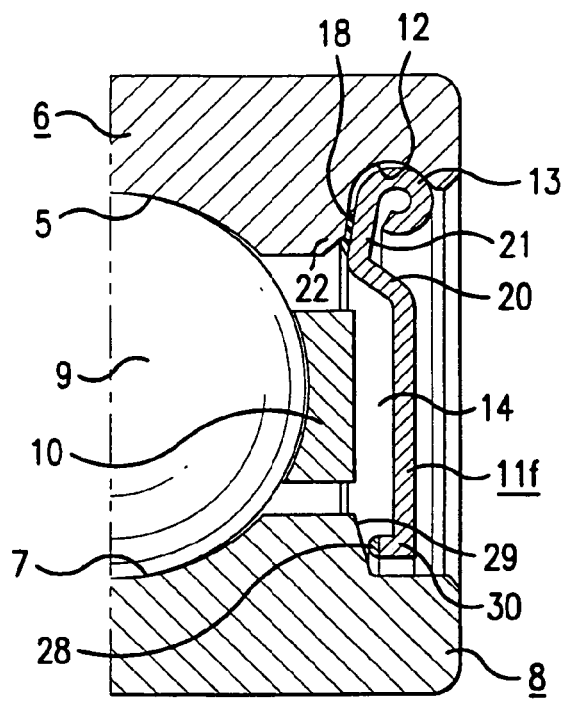
FIG. 19 is a cross sectional view similar to FIG. 3 to show another example of the embodiments of the present invention.

FIG. 19 shows a seventh example of the present invention, where the shield plate 11f has an inner peripheral portion which is formed with a bent portion 30. The second seal member 28 is attached generally circumferentially to the tip end edge of the bent portion 30. The second scat member 28 has a tip end edge faced and located close to the step portion 29 on the outer peripheral surface of the inner ring 8.

In the structures of the fifth to seventh example, a long labyrinth seal route is formed between the inner peripheral edge of the shield plate 11f and the outer peripheral surface of the inner ring 8 to improve the seal performance therebetween.

Figure 20:
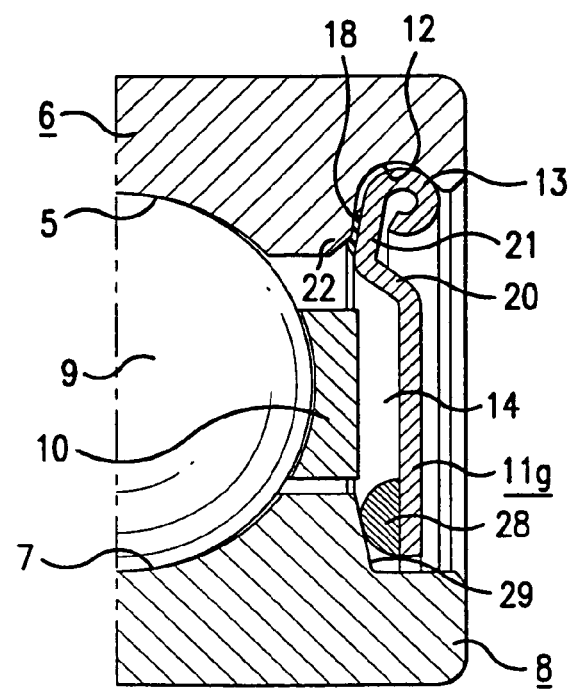
FIG. 20 is 'a cross sectional view similar to FIG. 3 to show another example of the embodiments of the present invention.

FIG. 20 shows an eighth example of the present invention, where the shield plate 11g has an inside surface to which the second seal member 28 is attached generally circumferentially at a location closer to the inner periphery of the shield plate 11g. The tip end edge of the second seal member 28 is slidingly engaged generally circumferentially with the step portion 29 on the outer peripheral surface of the inner ring 8.

Figure 21:
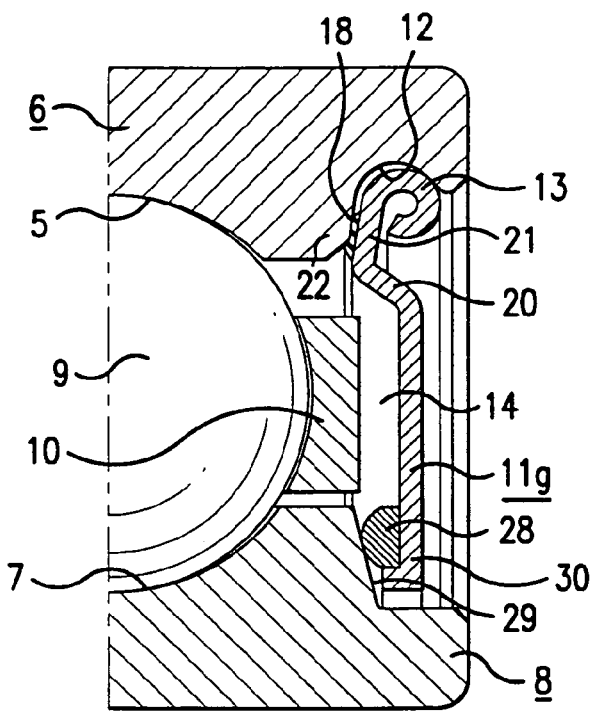
FIG. 21 is a cross sectional view similar to FIG. 3 to show another example of the embodiments of the present invention.

FIG. 21 shows a ninth example of the present invention, where the shield plate 11g has an inner peripheral edge portion which is formed with the bent portion 30 extending toward the step portion 29 on the outer peripheral surface of the inner ring 8. The second seal 28 is attached generally circumferentially to the inside surface of the shield plate 11g at a location closer to the outer periphery of the step portion 29 and closer to the inner periphery to the shield plate 11g. The tip end edge of the second seal member 28 is slidingly engaged generally circumferentially with the step portion 29 on the outer peripheral surface of the inner ring 8.

Figure 22:
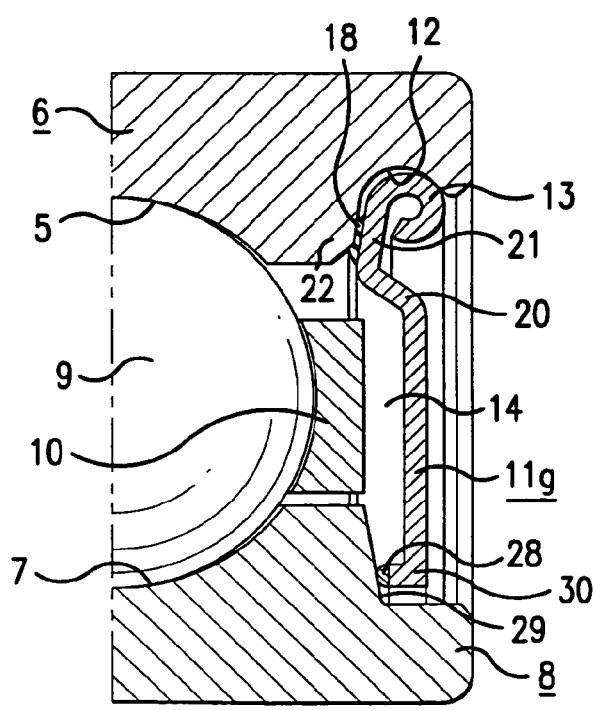
FIG. 22 is a cross sectional view similar to FIG. 3 to show another example of the embodiments of the present invention.
Figure 23:
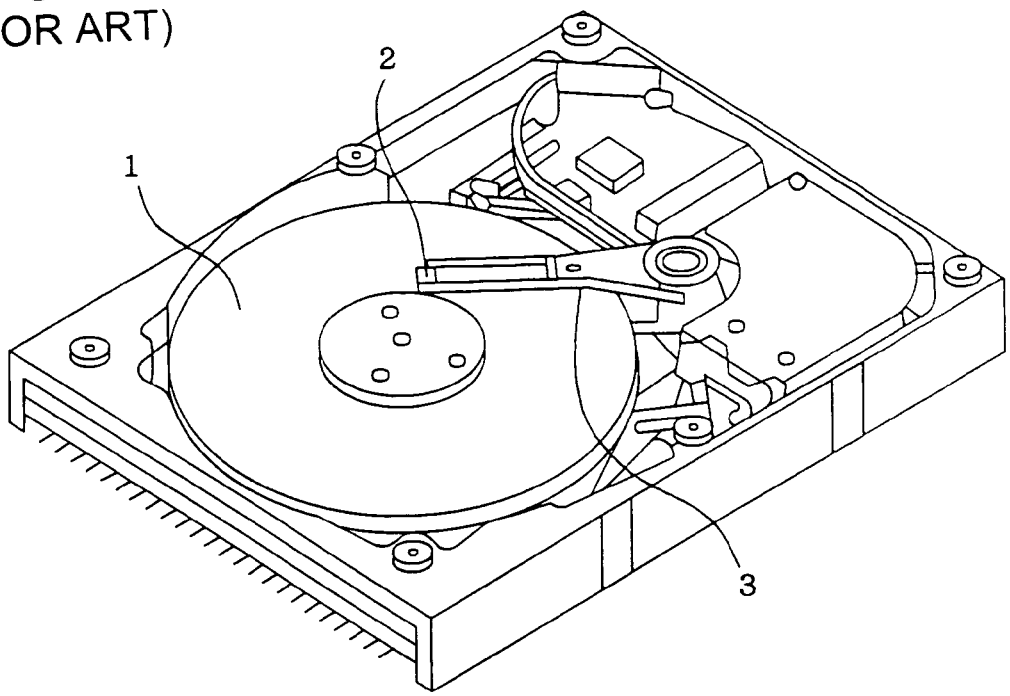
FIG. 23 is a perspective view of an example of the HDD with its cover removed, where the electric motor and swing arm are installed to support the spindle by way of the rolling bearing unit with shield plate of the present invention.

FIG. 22 shows a tenth example of the present invention, where the inner peripheral edge portion of the shield plate 11g is formed with the bent portion 30, to the tip end edge of which the second seal member 28 is attached generally circumferentially. The tip end edge of the second seal member 28 is slidably engaged generally circumferentially with the step portion 29 on the outer peripheral surface of the inner ring 8.

In the structures of the eighth to tenth examples, a perfect closure is provided between the inner peripheral surface of the shield plate 11g and the outer peripheral surface of the inner ring 8 to improve the seal performance therebetween.

Figure 29:
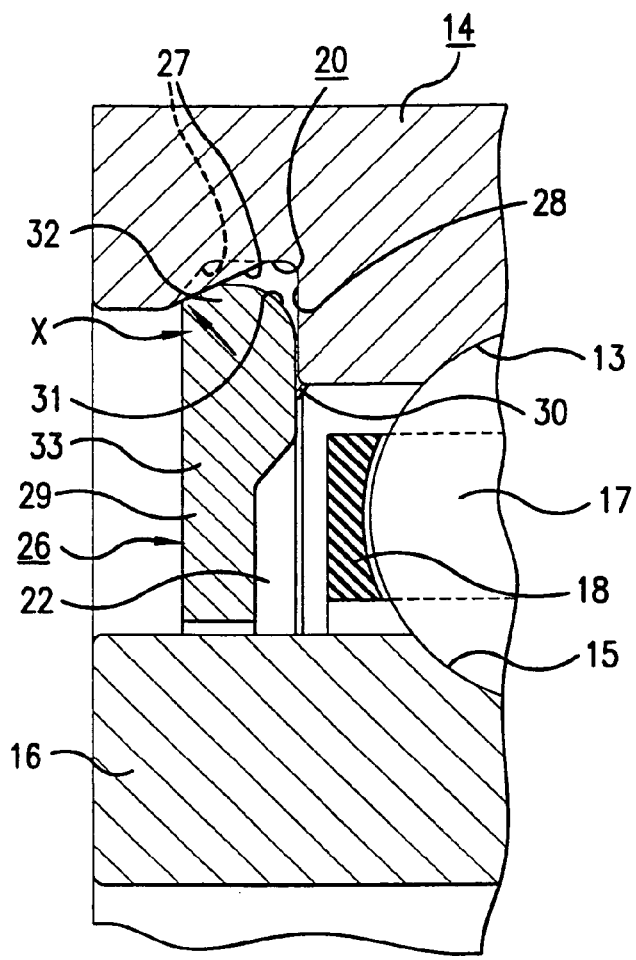
FIG. 29 is a cross sectional view of a part of the rolling bearing unit with shield plate according to another example of the embodiment of the present invention.
Figure 30:
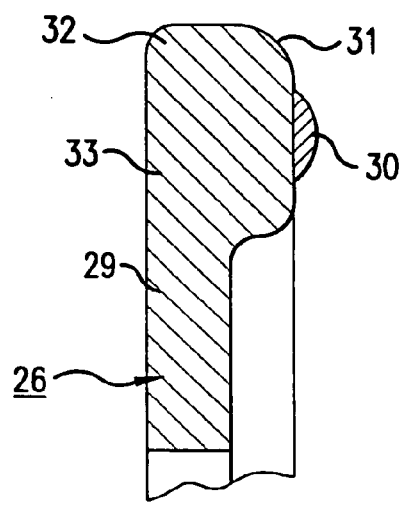
FIG. 30 is an enlarged cross sectional view of a part of the radially outer portion of the shield plate used in the example of FIG. 29.
Figure 31:
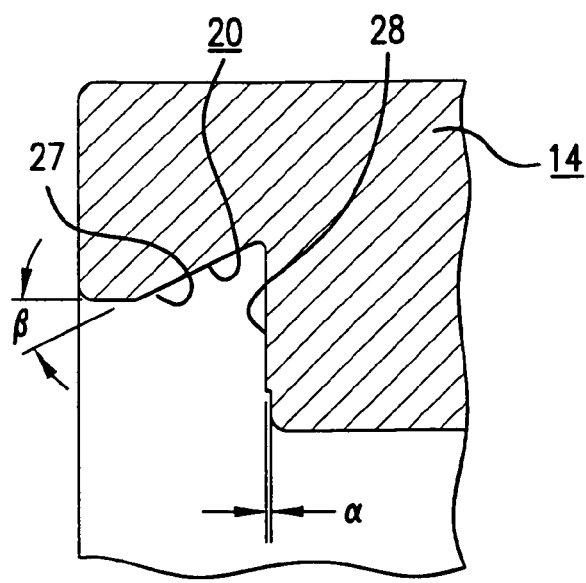
FIG. 31 is an enlarged cross sectional view of a part of the outer ring of the roiling bearing unit with shield plate of FIG. 29.

FIGS. 29 to 31 show another example of the embodiment of the present invention.

The outer ring 14 of the rolling bearing has an inner peripheral surface at least one axial end thereof which is formed with an anchoring groove 20 by way of a cutting process by turning using a forming tool, in which a seal plate or shield plate 26 is anchored at its outer peripheral edge. The anchoring groove 20 comprises an inner peripheral surface portion 27 to retain the outer peripheral edge of the shield plate 26 radially from outside, and an axially inner side surface portion 28 extending radially inward from the axially inner end edge of the inner peripheral surface portion 27. The axially inner means the widthwise central side of the outer ring 14.

It is desirable that the axially inner side surface portion 28 would be formed on the phantom flat surface orthogonal to the axis of the outer ring 14, but the axially inner side surface portion 28 is inclined with respect to the phantom flat surface at an angle α (see FIG. 31) of about 5 degrees to about 15 degrees to make the life of the forming tool longer.

On the other hand, the inner peripheral surface portion 27 is inclined with respect to the axis of the outer ring 14 at an angle of β (see FIG. 31) of about 10 degrees to about 30 degrees corresponding to the material and shape of the synthetic resin of the shield plate 26.

Incidentally, the inner surface of the anchoring groove 20 is usually finished with the cutting process by turning, but can be finished with the grinding process if the grinding stone of the grinding machine is formed with rotary dresser. In this case, since the surface roughness of the anchoring groove 20 is improved in about 0.1S to about 1S, the seal performance of the shield plate 26 can be improved. Thus, the grinding finishing of the inner surface of the anchoring groove 20 is useful as a technology which can be selected in designing the rolling bearing with seal plate.

The shield plate 26 comprises a generally annular main body 29 made of synthetic resin, and a seal member 30 made of an elastic material and attached to the axially inner side surface of the main body 29 generally circumferentially on its radially outer portion (an upper portion on the right side surface in FIGS. 29 and 30) short of the outer peripheral edge of the main body 29. Selected for the seal member 30 is a material which does not contain any volatile substance nor make any pollutant substance ooze out in the space where the rolling bearing with seal plate is installed.

The main body 29 has an inclined surface portion 31 on the axially inner surface side and a protruding portion 32 along its outer peripheral edge on the axially outer surface side. The inclined surface portion 31 is formed in a tapered convex shape or in a partially spherical shape such that the outer diameter of the inclined surface portion 31 is made smaller toward the axially inner surface side. The protruding portion 32 on the axially outer surface side (the left side in FIGS. 29 and 30) has the peripheral end edge projected.

The main body 29 has a thick material portion 33 formed in its radially outer half the axially inner side surface of which is inclined in the substantially same direction as the axially inner side surface 27 of the anchoring groove 20.

The seal member 30 is generally circumferentially attached to the axially inner side surface of the thick material portion 33.

The shield plate 26 is attached to the inner peripheral surface of the axially outer end portion of the outer ring 14 with the outer peripheral edge portion of the main body 29 pressed into and anchored to the anchoring groove 20.

In this state, the seal member 30 is elastically held generally circumferentially between the axially inner side surface of the thick material portion 33 of the main body 29 and the axially inner side surface portion 28 of the anchoring groove 20. Specifically, in the state where the main body 29 is pressed into the anchoring groove 20, the protruding portion 32 formed along the outer peripheral edge of the main body 29 comes generally circumferentially into contact with the inner peripheral surface portion 27 of the anchoring groove 20, so that a force $f_1$ is applied to the contact area in the compression direction, that is in the direction of Arrow X in FIG. 29. The main body 29 is forced to the axially inner side surface 28 of the anchoring groove 20 by the component in the axial direction of the outer ring 14 of time force $f_1$. As a result, the seal member 30 attached to the axially inner side surface of the thick material portion 33 is generally circumferentially tightly engaged with the axially inner side surface 28 of the anchoring groove 20.

Consequently, the base oil construent of grease is prevented from leaking out of the space 22 where the rolling members 17 are provided between the inner peripheral surface of the outer ring 14 and the outer peripheral surface of the inner ring 16. The seal member 30, elastically held between the axially inner side surface of the thick material portion 33 of the main body 29 and the axially inner side surface portion 28 of the anchoring groove 20, is not exposed outside of the rolling bearing section.

The seal member 30 is made of a material which does not contain any volatile substance nor make any pollutant substance ooze out in the space where the rolling bearing unit with seal plate is installed and therefore hardly contaminates the space.

Even when the outer diameter of the main body 29 is expanded and contracted due to the heat cycle with ON/OFF cycle of the spindle motor having the rolling bearing unit with seal plate installed therein, the seal member 30 is kept compressed between the axially inner side surface of the thick material portion 33 and the axially inner side surface portion 28 of the anchoring groove 20. In other words, even if the contact pressure between time protruding portion 32 on the outer peripheral edge of the main body 29 and the inner peripheral surface portion 27 of the anchoring groove 20 is inclined to be more or less lower, it is compensated by the elastic deformation of the seal member 30 so as to secure the seal performance between the axially inner side surface of the thick material portion 33 and the axially inner side surface portion 28 of the anchoring groove 20. Thus, any leakage of the basic oil construent of grease from the space 22 is prevented.

Incidentally, the inner peripheral surface portion 27 of the anchoring groove 20 is not necessarily inclined throughout the whole width. For example, as illustrated by the dotted lines in FIG. 29, only the axially outer half in contact with the protruding portion 32 is inclined with the axially inner half being a simple cylindrical surface.

Next, the material of the seal member 30 and the synthetic resin of the main body 29 are explained. The substances as shown in Table I are useful as the synthetic resin of the main body 29 while the substances as shown in Table 2 are useful as the elastic material for the seal member 30.

TABLE 1

| material name | | coefficient of liner expansion $(10^{-5}/° C.)$ | rate of stretching (%) | tensile strength $(kg/mm^2)$ |
|---|---|---|---|---|
| nylon 6 | non-reinforced | 8.5 | 200 | 7.4 |
| | glass fiber 30% | 2.5 | 5 | 16 |
| nylon 66 | non-reinforced | 8.5 | 60 | 8.0 |
| | glass fiber 30% | 3.0 | 5 | 17.0 |
| nylon 11 | non-reinforced | 9.1 | 330 | 5.5 |
| | glass fiber 30% | 3.0 | 5 | 9.5 |
| polybutylene terephtha late (PBT) | non-reinforced | 6~9.5 | 50~300 | 5.8 |
| | glass fiber 30% | 1.1~6.1 | 2~4 | 12~13.4 |
| polyacetals | non-reinforced | 8.1 | 25~75 | 7 |
| | glass fiber 30% | 3.6~8.1 | 2~7 | 6~7.7 |
| PBT | non-reinforced | 9.4 | 300 | 5.6 |
| | glass fiber 30% | 2 | 4 | 14 |
| elastomer polyurethane | — | 10~20 | 100~650 | 3.2~5.9 |
| POM | non-reinforced | 10 | 60 | 6.1 |
| | glass fiber 25% | 6 | 3 | 12.8 |
| PC | non-reinforced | 7 | 100 | 6.3 |
| | glass fiber 30% | 2.7 | 4 | 12.5 |
| modified PPE | non-reinforced | 6 | 60 | 6.5 |
| | glass fiber 30% | 2.5 | 5 | 12 |
| polysulfone | non-reinforced | 5.5 | 70 | 7.1 |
| | glass fiber 30% | 2.5 | 2 | 13 |
| polyacrylate | non-reinforced | 6.2 | 70 | 7.3 |
| | glass fiber 30% | 4.0 | 10 | 10.5 |
| polyethr sulfone | non-reinforced | 5.5 | 40~80 | 8.6 |
| | glass fiber 30% | 2.3 | 3 | 14.3 |
| PPS | non-reinforced | 2.5 | 1.6 | 6.7 |
| | glass fiber 40% | 2.2 | 1.3 | 13.7 |

TABLE 2

| Name of Resin | Method of Curing |
|---|---|
| epoxy resin | heat curable type |
| polyurethane resin | |
| reactive acrylic resin | ultraviolet ray curable type |
| polyester resin | heat curable type |
| vinyl ether resin | |
| acrylic rubber | heat curable type |

The synthetic resins for the main body 29 shown as a basic material in Table 1 can be used alone or in a mixture. Specifically, the synthetic resins as shown in Table 1 can be used selectively alone or in a mixture of two or more taking into consideration of thermal creep, oil resistance, improvements in attachment of the shield plate 26 facing the axially inner side surface 28 and inner peripheral surface 27 of the anchoring groove 20. When working the present invention using the synthetic resins in Table 1, fillers such as glass fibers can be added in the synthetic resin or resins to increase the material strength so as to improve the creep resistance (resistance to plastic deformation) upon temperature increase, and simultaneously to make the linear expansion coefficiency of the resulting material closer to that of the metal material of bearing steel etc. of the outer ring 14. In this case, the amount of the mixed filler such as glass fiber etc. is generally about 5 to about 30%, and changed correspondingly to the required performance to adjust the physical properties of the resulting material.

With the elastic materials for the seal member 30 as shown in Table 2, it is important to select the materials by which the difference between the elasticity (amount of expansion and contraction) of the main body 29 and that of the seal member 30 is sufficiently secured (large difference in elasticity). Specifically, it is important that by way of the elastic repulsive force of the protruding portion 32 of the main body 29 in engagement with the inner peripheral surface portion 27 of the anchoring groove 20, the seal member 30 attached to the axially inner side surface of the thick material portion 23 of the main body 29 is tightly engaged with the axially inner side surface portion 28 of the anchoring groove 20 generally circumferentially so as to maintain tight engagement force to seal the grease and the basic oil construent separated from the grease within the rolling bearing.

The seal member 30 made of a material selected from Table 2 is attached to the main body 29 made of a material or materials selected from Table 1 by the following steps. First, a material (liquid resin) is selected from Table 2 for good adhesion performance with respect to the main body 29 of the material or materials selected from Table 1. The material used here is controlled to have the viscosity between about 8000 cst±2000 cst around the normally used room temperature for smooth operation. This material is coated on the axially inner side surface of the thick material portion of the main body 29, and cured for example by way of ultraviolet ray irradiation. When using the resin of the ultraviolet ray curable type, it is desirable that the axially inner side surface of the thick material portion 33 is formed with an annular thin recess portion circumferentially to receive the ultraviolet ray curable resin before being cured. The liquid resin is attached onto the annular recess portion and raised by surface tension. The height S of the liquid resin raised from the axially inner side surface of the thick material portion 33 is about 0.02 mm to about 0.2 mm, desirably about 0.04 mm to about 0.1 mm. The height S is controlled by changing the amount of the attached material and for the viscocity.

The depth of the annular recess portion is about 10 $\mu$m to about 30 $\mu$m at the center for the liquid resin before being cured to be kept at the predetermined location. In order to make the height of the raised portion larger with a small amount of the resin, the temperature of the operation environment for coating the main body 29 with the liquid resin is lower so that the viscosity of the liquid resin is higher. Since the ultraviolet rays can penetrate into the synthetic resin by the depth of about 3 mm at most, the seal member 30 coated on the thick material portion 33 can be generally evenly cured. Similar consideration can be applied to the heat curable resin, but the maximum curable thickness of the heat curable resin is substantially proportional to the viscosity of the liquid resin and the heating time, and another preferable consideration can be applied to a hardness of the cured seal member 30, but the hardness is less than 60 by Durometer with D scale. In this case, the tight engagement force is maintained more efficiently. This condition can be applied to any type of shield plate.

The surface of the seal member 30 is sticky when formed by curing the liquid resin in the atmosphere, and smooth when formed by curing it in the inactive gas. Either surface condition on the surface of the seal member 30 can be useful, and can be selected depending on the treatment of the shield plate 26. For example, when the ultraviolet curable resin is cured in the nitrogen environment, the resulting surface of the seal member 30 is smooth, and it is easily pressed into the anchoring groove 20 of the outer ring 14 for support.

The liquid resins in Table 2 can be mixed with fluorine containing polymer or origomer having no affinity with oil to increase the non-affinity of the seal member with oil, so that the grease filled in the rolling bearing or the basic oil constituent in the grease hardly passes through the seal member.

Figure 32:
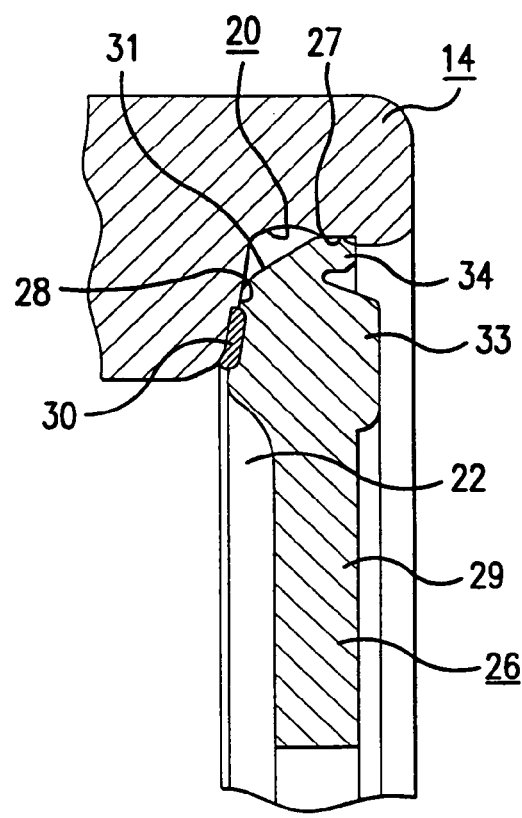
FIG. 32 is a cross sectional view of a part of the rolling bearing unit with shield plate according to another example of the embodiment of the present invention.
Figure 33:
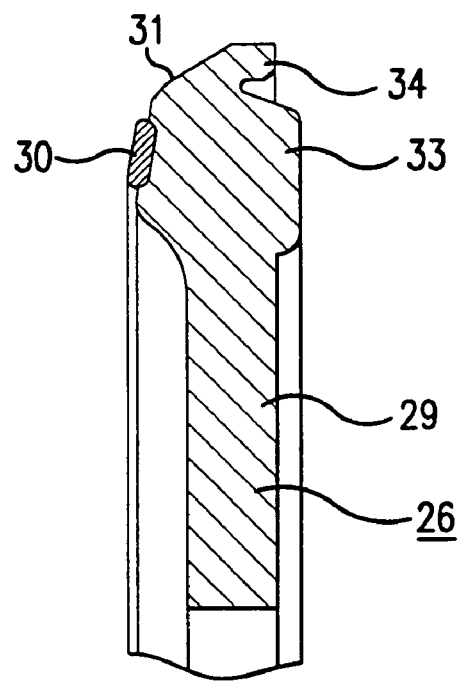
FIG. 33 is a cross sectional view of a part of the radially outer portion of the shield plate used in the example of FIG. 32.
Figure 34:
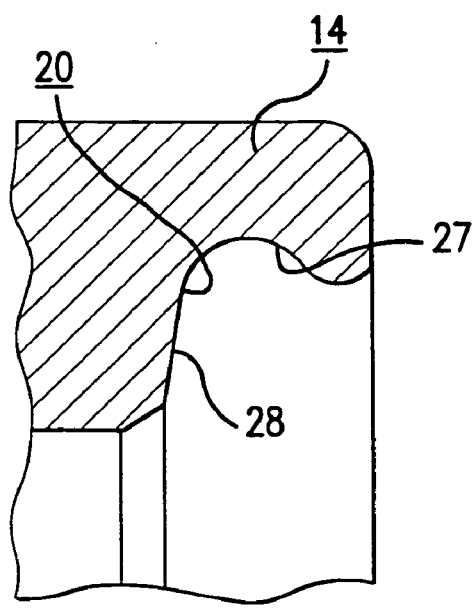
FIG. 34 is an enlarged cross sectional view of a part of the outer ring of the rolling bearing unit with seal plate of FIG. 32.

FIGS. 32 to 34 show another example of the embodiment of the present invention. In this example, the outer peripheral edge of the synthetic resin main body 29 is generally circumferentially formed with an elastic lip 34 projecting on the axially outer surface side (on the side of the right side surface in FIGS. 32 and 33) of the main body 29. When the outer peripheral edge of the main body 29 is pressed into the anchoring groove 20 on the inner peripheral surface at the axial end of the outer ring 14, the elastic lip 34 is engaged with the inner peripheral surface portion 27 of the anchoring groove 20. With this elastic lip 34, the thermal creep wherein the outer peripheral edge of the main body 29 is plastically deformed upon temperature increase, can be avoided. In this case, the force to press the seal member 30 toward the axially inner side surface portion 28 of the anchoring groove 20 is a little lower, but the seal performance of the seal member 30 can be sufficiently secured by tailoring the shape of the elastic lip 34.

Figure 35:
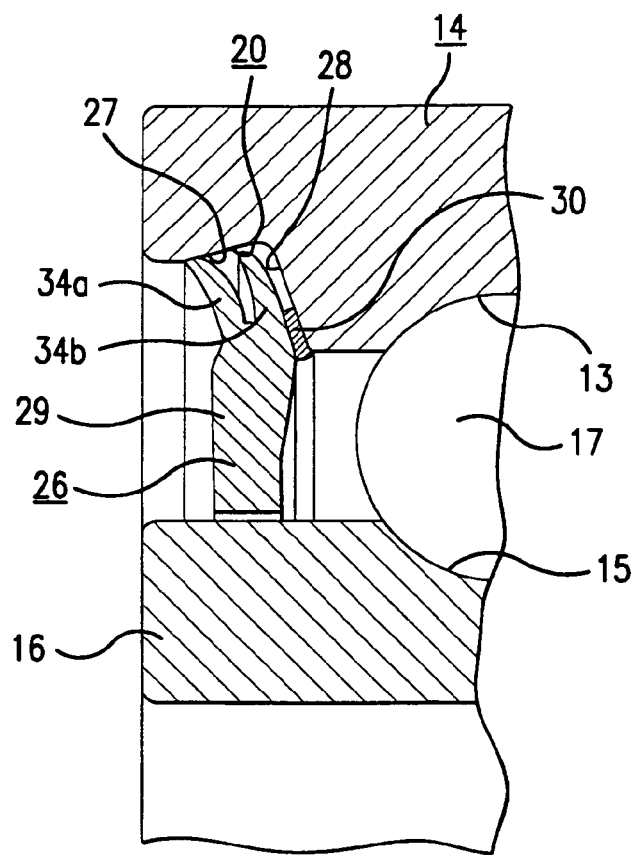
FIG. 35 is a cross sectional view of a part of the rolling bearing unit with shield plate according to another example of the embodiment of the present invention.
Figure 36:
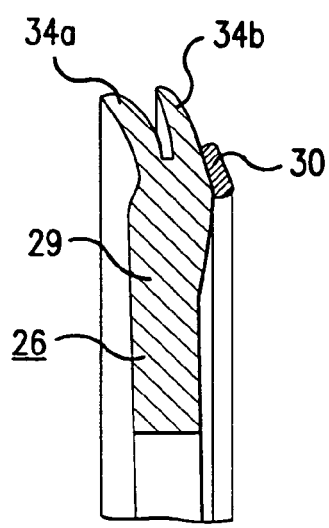
FIG. 36 is a cross sectional view of a part of the radially outer portion of the shield plate used in the example of FIG. 35.

FIGS. 35 and 36 show another example of the embodiment of the present invention. In this example, the outer peripheral edge of the main body 29 is generally circumferentially formed with two inner and outer elastic lips 34a, 34b.

The elastic lip 34a on the side of the axially outer side surface (on the left side in FIGS. 35 and 36) is engaged with the inner peripheral surface portion 27 of the anchoring groove 20 while the elastic lip 34b on the side of the axially inner side surface (on the right side in FIGS. 35 and 36) elastically forces the seal member 30 attached to the axially inner side surface of the main body 19 toward the axially inner side surface portion 28 of the anchoring groove 20.

Figure 37:
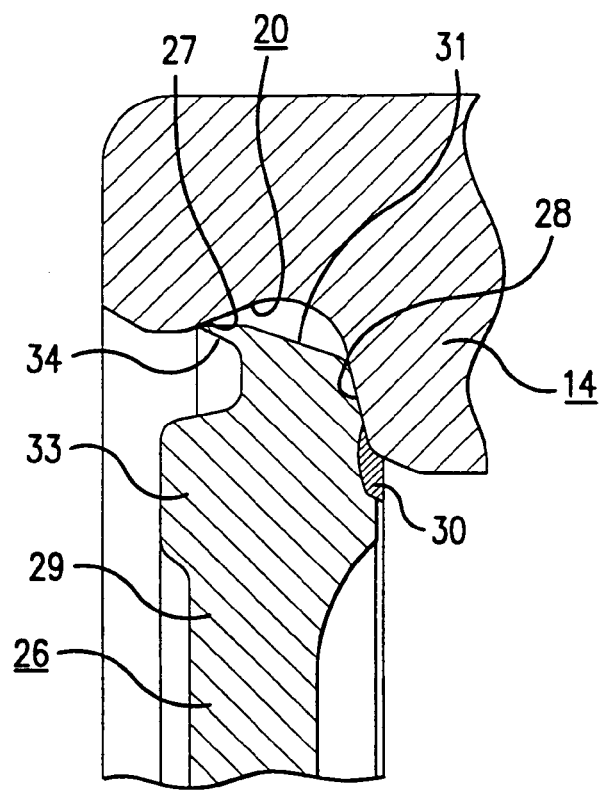
FIG. 37 is a cross sectional view of a part of the rolling bearing unit with shield plate according to another example of the embodiment of the present invention.

FIG. 37 shows another example of the embodiment of the present invention. In this example, the widthwise central portion of the seal member 30 attached to the axially inner side surface of the thick material portion 33 of the main body 29 is abutted to the inner peripheral edge of the axially inner side surface portion 28 of the anchoring groove 20. In this case, as the contact pressure between the inner peripheral edge of the axially inner side surface portion 28 and the seal member 30 is larger, the seal performance of the seal member 30 is improved.

Figure 38:
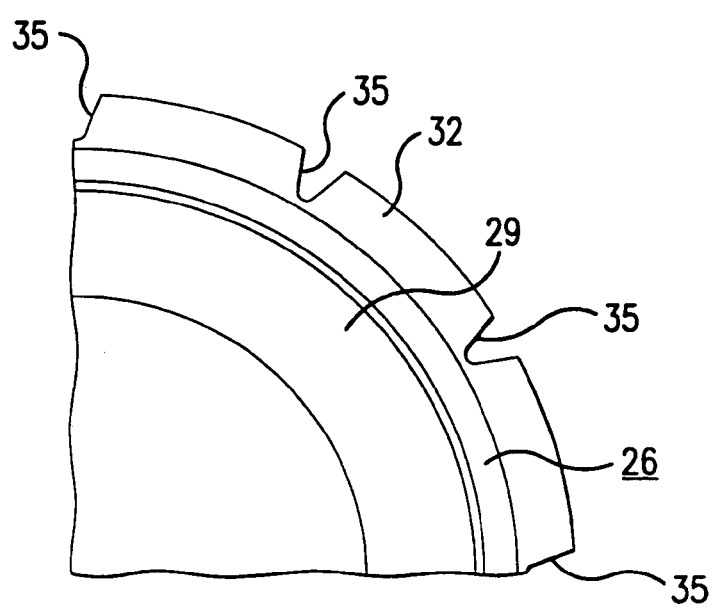
FIG. 38 is a front elevational view of a part of the shield plate used in the example of FIG. 37
Figure 39:
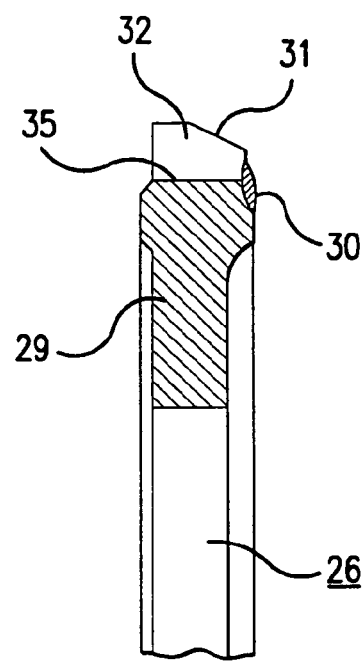
FIG. 39 is an enlarged cross sectional view of a part of the radially outer portion of the seal plate used in the example of FIG. 37.

FIGS. 38 and 39 show another example of the embodiment of the present invention. In this example, the outer peripheral edge of the main body 29 is generally circumferentially formed with a plurality of cutouts 35 to control the engagement force between the outer peripheral edge of the shield plate 26 and the inner peripheral surface portion 27 (see FIG. 29) of the anchoring groove 20.

Next, the steps of pressing and anchoring the outer peripheral edge of the shield plate 26 in the examples mentioned above into the anchoring groove 20 formed in the inner peripheral surface at the axial end of the outer ring 14 are explained.

Figure 40:
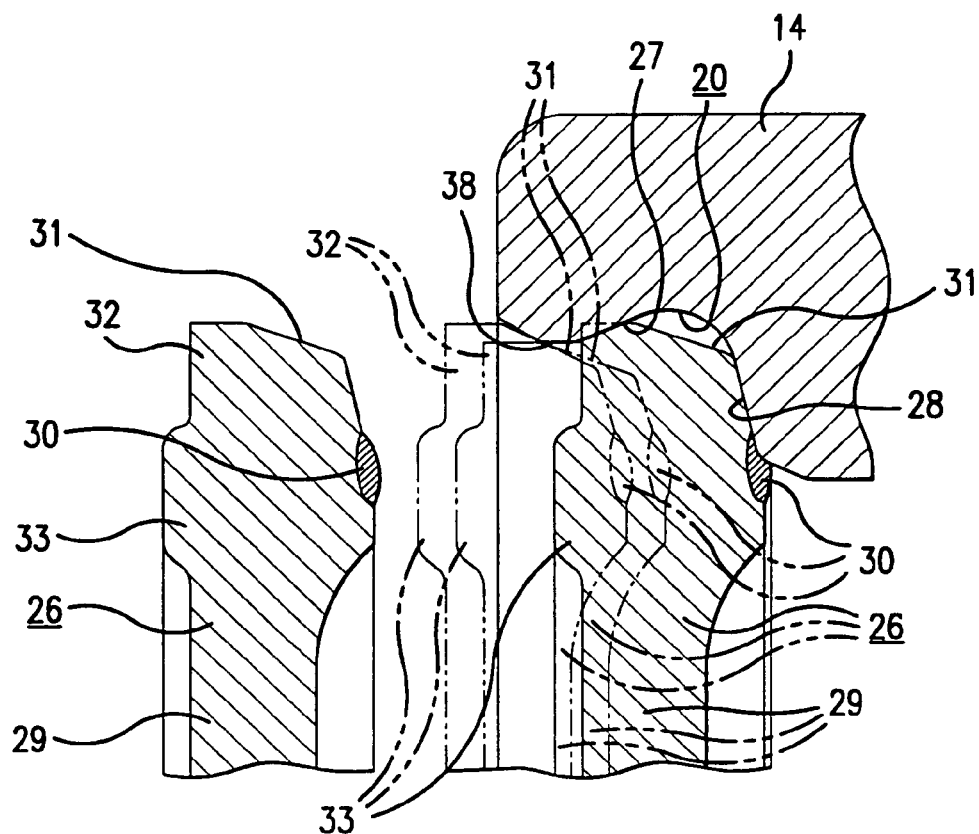
FIG. 40 is a cross sectional view of a part of the rolling bearing unit with shield plate according to another example of the embodiment of the present invention, showing the step of anchoring the outer peripheral portion of the shield plate in the anchoring groove, wherein the shield plate is illustrated by phantom lines at some locations.
Figure 41:
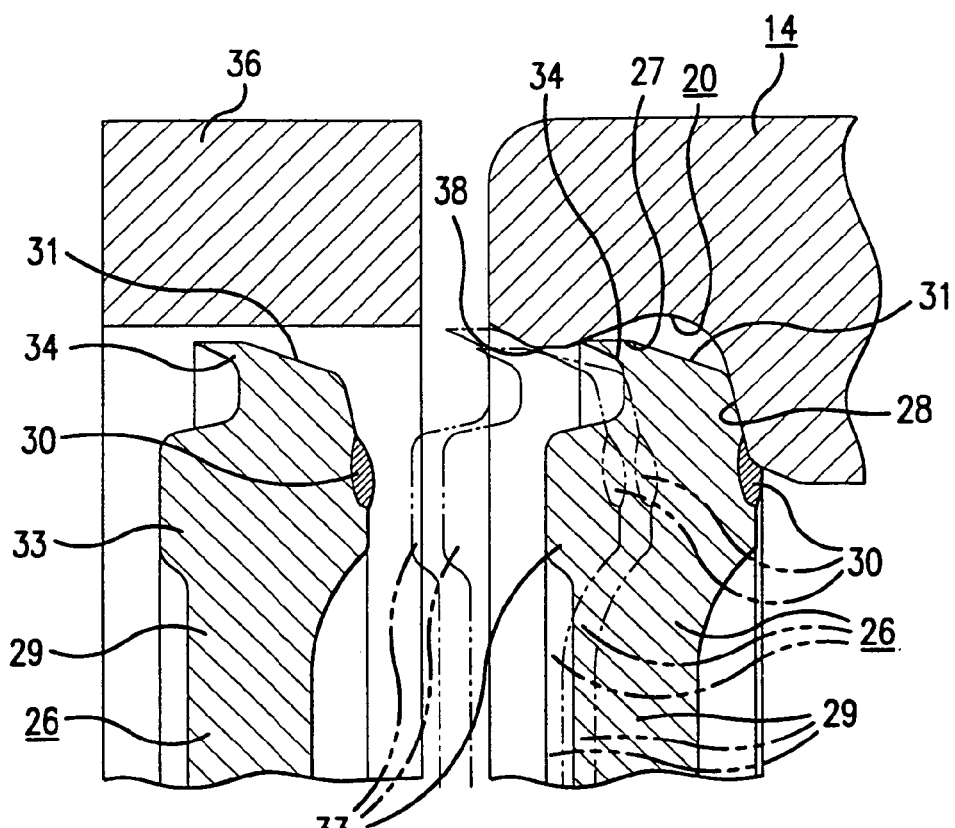
FIG. 41 is a cross sectional view of a part of the rolling bearing unit with seal plate according to another example of the embodiment of the present invention, together with part of a guide tube for improving operation efficiency, showing the step of anchoring the outer peripheral portion of the shield plate in the anchoring groove, wherein the shield plate is illustrated by phantom lines at some locations.
Figure 42:
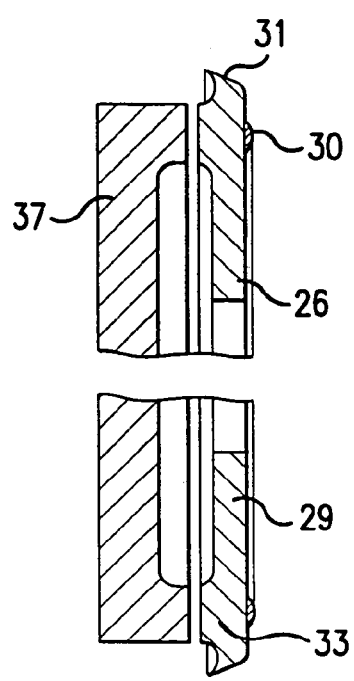
FIG. 42 is a partly cut-away cross sectional view of a jig to be used in the anchoring step.

The points into which care must be taken in the pressing and anchoring steps, is that as shown in FIG. 40, while the concentricity between the center of the shield plate 26 and the center of the axially outer edge or annular projection 38 of the anchoring groove 20 is kept good as much as possible, the shield plate 26 is guided closer to the annular projection 38. Accordingly, as required, a cylindrical guide member 36 is provided close to and opposed to the open end of the outer ring 14 as shown in FIG. 41, and the shield plate 26 is carried through the guide member 36. And, in the state where the shield plate 26 is guided near the annular projection 38, the shield plate 26 is pressed into the anchoring groove 20 using the pressing tool 37 as shown in FIG. 42. When doing this process, the lower dead point of the seal insertion press (not shown) is set, so that the protruding portion 32 (see FIGS. 29, 30, 39 and 40) provided on the outer peripheral edge of the shield plate 26, or the elastic lip 34, 34a, 34b (see FIGS. 32, 33, 35~37) is sufficiently forced into the anchoring groove 20. If the lower dead point of the seal insertion press (not shown) is not well set, the protruding portion 32 of the shield plate 26 or the elastic lip 34, 34a, 34b can not pass by the annular projection 38 of the anchoring groove 20, so that the seal effect may not be available.

The invention claimed is:

1. A rolling bearing unit with shield plate, comprising:
   an outer ring having an outer ring raceway and an anchor groove formed on an inner peripheral surface thereof, the anchor groove being circumferentially provided at an axial end portion separated from the outer ring raceway and having an outside facing side surface;
   an inner ring having an inner ring raceway formed on an outer peripheral surface thereof;
   a plurality of rolling members rotatably positioned between the outer ring raceway and the inner ring raceway; and
   a shield plate formed in a generally circular ring shape and provided with an inside facing, radial outer portion and an outer peripheral edge portion anchored in the anchor groove on the inner peripheral surface of the outer ring at the axial end portion of the outer ring, the shield plate having an elastic seal member formed of a curable polymer substance in a solid state and integrally attached generally circumferentially to the radial outer portion of the shield plate, the elastic seal member being disposed slightly radially inwardly with respect to the outer peripheral edge portion of the shield plate, such that the seal member is elastically held between the radial outer portion of the shield plate and the outside facing side surface of the anchor groove, and the shield plate formed with cutouts along the outer peripheral portion thereof, and
   wherein the number "n" of the cutouts and the number "Z" of the rolling members of the rolling bearing are controlled to satisfy each of the following four relationships (1) $n \geq 4$, (2) $n \neq Z$, (3) $n \neq Z \pm 1$ and (4) $n \leq 2Z$.

2. The rolling bearing unit with shield plate of claim 1, wherein the anchor groove has a generally circumferential end edge portion contacting a widthwise central portion of the seal member.

3. The rolling bearing unit with shield plate of claim 2, wherein the seal member is made from an organic elastic material cured in polymerizing reaction by heat or light.

4. The rolling bearing unit with shield plate of claim 3, wherein the organic elastic member has a viscosity in the range of 8000 ±2000 cPs at 25° C.

5. The rolling bearing unit with shield plate of claim 3, wherein the organic elastic member has a coating of a substance having substantially non-affinity for oil.

6. The rolling bearing unit with shield plate of claim 5, wherein the substance is fluorine.

7. The rolling bearing unit with shield plate of claim 3, wherein the seal member has a tip end that is curved at a free state and a thickness in the range from $0.3T_{11d}$ to $1.5T_{11d}$, where $T_{11d}$ is the thickness of the shield plate.

8. The rolling bearing unit with shield plate of claim 3, wherein the seal member has a tip end that is straight at a free state and a thickness in the range from $0.2T_{11d}$ to $1.2T_{11d}$, where $T_{11d}$ is the thickness of the shield plate.

9. The rolling bearing unit with shield plate of claim 3, wherein the outside facing side surface of the anchor groove facing the member has at least one concavity.

10. The rolling bearing unit with shield plate of claim 2, wherein the shield plate has an inner peripheral portion, and a labyrinth seal is formed between the inner peripheral portion of the shield plate and the outer peripheral surface of the inner ring.

11. The rolling bearing unit with shield plate of claim 2, wherein the shield plate has an inner peripheral portion, and including a contact seal formed between the inner peripheral portion of the shield plate and the outer peripheral surface of the inner ring.

12. The rolling bearing unit with the shield plate of claim 2, wherein the thickness of the seal member attached to the shield plate is the range from 0.02 mm to 0.5 mm.

13. The rolling bearing unit with the shield plate of claim 2, wherein the thickness of the seal member attached to the shield plate is the range from 0.04 mm to 0.2 mm.

14. The rolling bearing unit with shield plate of claim 1, wherein the seal member is attached at a location satisfying the following condition: $D_{18} > R_6 > R_{18} > R_{21}$ wherein $D_{18}$ is the outer diameter of the seal member, $R_{18}$ is the inner diameter of the seal member, $R_6$ is the inner diameter of the outer ring, and $R_{21}$ is the inner diameter of the radially outer portion of the shield plate.

15. The rolling bearing unit with shield plate of claim 1, wherein the outside facing side surface of the anchor groove is inclined by an angle θ with reference to a plane orthogonal to the central axis of the rolling bearing, and the radial outer portion of the shield plate in contact with the anchor groove is tilted by an angle of (θ+α) within the range of 0 degrees to 5 degrees.

16. The rolling bearing unit with shield plate of claim 1, wherein the seal member is made from an organic elastic material cured in polymerizing reaction by heat or light.

17. The rolling bearing unit with shield plate of claim 16, wherein the organic elastic member has a viscosity in the range of 8000 ±2000 cPs at 25° C.

18. The rolling bearing unit with shield plate of claim 16, wherein the organic elastic member has a coating of a substance having substantially non-affinity for oil.

19. The rolling bearing unit with shield plate of claim 18, wherein the substance is fluorine.

20. The rolling bearing unit with shield plate of claim 16, wherein the seal member has a tip end that is curved at a free state and a thickness in the range from $0.3T_{11d}$, to $1.5T_{11d}$, where $T_{11d}$ is the thickness of the shield plate.

21. The rolling bearing unit with shield plate of claim 16, wherein the seal member has a tip end that is straight at a free state and a thickness in the range from $0.2T_{11d}$ to $1.2T_{11d}$, where $T_{11d}$ is the thickness of the shield plate.

22. The rolling bearing unit with shield plate of claim 16, wherein the outside facing side surface of the anchor groove facing the seal member has at least one concavity.

23. The rolling bearing unit with shield plate of claim 1, wherein the shield plate has an inner peripheral portion, and a labyrinth seal is formed between the inner peripheral portion of the shield plate and the outer peripheral surface of the inner ring.

24. The rolling bearing unit with shield plate of claim 1, wherein the shield plate has an inner peripheral portion, and including a contact seal formed between the inner peripheral portion of the shield plate and the outer peripheral surface of the inner ring.

25. The rolling bearing unit with the shield plate of claim 1, wherein the thickness of the seal member attached to the shield plate is the range from 0.02 mm to 0.5 mm.

26. The rolling bearing unit with the shield plate of claim 1, wherein the thickness of the seal member attached to the shield plate is the range from 0.04 mm to 0.2 mm.

27. The rolling bearing unit with the shield plate of claim 1, wherein the shield plate is made of a member selected from a group consisting of a metal and a synthetic resin.

28. The rolling bearing unit with a shield plate of claim 1, wherein the outer peripheral edge portion has a substantially semi-circular shape in cross-section.

* * * * *